(12) United States Patent
Kadowaki et al.

(10) Patent No.: US 11,243,620 B2
(45) Date of Patent: *Feb. 8, 2022

(54) SENSOR CONTROLLER

(71) Applicant: Wacom Co., Ltd., Saitama (JP)

(72) Inventors: Jun Kadowaki, Tokyo (JP); Hideyuki Komatsu, Saitama (JP); Haruhiko Hisano, Kanagawa (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/157,824

(22) Filed: Jan. 25, 2021

(65) Prior Publication Data
US 2021/0149505 A1 May 20, 2021

Related U.S. Application Data

(63) Continuation of application No. 16/598,881, filed on Oct. 10, 2019, now Pat. No. 10,901,536, which is a
(Continued)

(30) Foreign Application Priority Data

Nov. 14, 2017 (WO) .................. PCT/JP2017/040877

(51) Int. Cl.
G06F 3/0354 (2013.01)
G06F 3/038 (2013.01)
(Continued)

(52) U.S. Cl.
CPC ........ *G06F 3/03545* (2013.01); *G06F 3/0383* (2013.01); *G06F 3/044* (2013.01);
(Continued)

(58) Field of Classification Search
USPC ........................................ 345/174
See application file for complete search history.

(56) References Cited

U.S. PATENT DOCUMENTS 5,798,756 A * 8/1998 Yoshida .................. G06F 3/046
345/179
2009/0154381 A1* 6/2009 Chan ....................... H04B 3/23
370/286
(Continued)

FOREIGN PATENT DOCUMENTS

JP 2013-171369 A 9/2013
JP 2014-63249 A 4/2014
(Continued)

OTHER PUBLICATIONS

International Search Report and Written Opinion, dated Dec. 26, 2017, for International Application No. PCT/JP2017/040877, 7 pages.

*Primary Examiner* — Chineyere D Wills-Burns
(74) *Attorney, Agent, or Firm* — Seed IP Law Group LLP

(57) ABSTRACT

A sensor controller is provided, to be connected to a sensor electrode group configuring a surface. The sensor controller supplies a determined AC signal to one or more AC signal transmission electrodes that form part of a plurality of sensor electrodes included in the sensor electrode group, and the sensor controller transmits, from cancellation signal transmission electrode(s) different from the AC signal transmission electrodes, a cancellation signal configured to prevent a signal transmitted from the AC signal transmission electrodes from appearing in a ground terminal of a detection circuit of the stylus. The sensor controller thusly configured may facilitate preventing a situation in which the stylus cannot detect an uplink signal and facilitate preventing the uplink signal from affecting the operation of another apparatus such as a display apparatus.

19 Claims, 23 Drawing Sheets

Related U.S. Application Data continuation of application No. 16/189,954, filed on Nov. 13, 2018, now Pat. No. 10,444,870.

(51) Int. Cl.
*G06F 3/041* (2006.01)
*G06F 3/044* (2006.01)

(52) U.S. Cl.
CPC ........ *G06F 3/0418* (2013.01); *G06F 3/04162* (2019.05); *G06F 3/041661* (2019.05); *G06F 2203/04104* (2013.01)

(56) References Cited

U.S. PATENT DOCUMENTS

| | | | |
|---|---|---|---|
| 2011/0090146 A1* | 4/2011 | Katsurahira | G06F 3/0383 345/156 |
| 2013/0106797 A1* | 5/2013 | Pant | G06F 3/03545 345/179 |
| 2014/0078101 A1* | 3/2014 | Katsurahira | G06F 3/04182 345/174 |
| 2015/0035797 A1* | 2/2015 | Shahparnia | G06F 3/0416 345/174 |
| 2015/0242043 A1* | 8/2015 | Oda | G06F 3/04162 345/174 |
| 2016/0077611 A1* | 3/2016 | Katsurahira | G06F 3/04182 345/179 |
| 2016/0188016 A1* | 6/2016 | Munakata | G06F 3/0446 345/179 |
| 2016/0246389 A1* | 8/2016 | Munakata | G06F 3/03545 |
| 2016/0266673 A1* | 9/2016 | Dinu | G06F 3/0442 |
| 2017/0038884 A1* | 2/2017 | Qiao | G06F 3/0412 |
| 2017/0235384 A1* | 8/2017 | Fleck | G06F 3/04162 345/174 |
| 2018/0024654 A1* | 1/2018 | Koike | G06F 3/0383 345/174 |

FOREIGN PATENT DOCUMENTS

| | | |
|---|---|---|
| JP | 2017-162517 A | 9/2017 |
| WO | 2017-029836 A1 | 11/2017 |

\* cited by examiner

FIG.4

| PRE | | COM | | | |
|---|---|---|---|---|---|
| P | P | D | D | D | D |

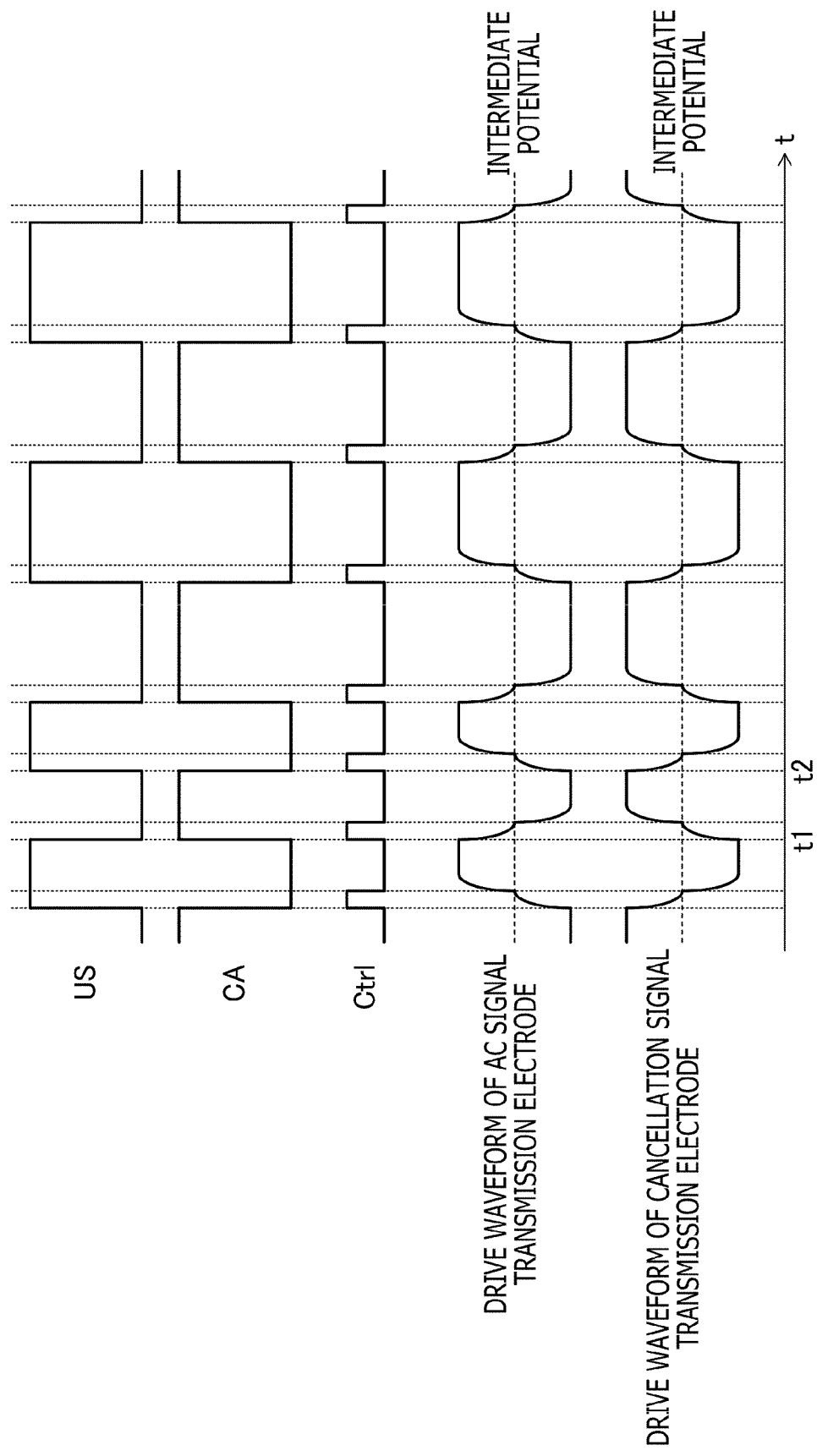

SENSOR CONTROLLER

BACKGROUND

Technical Field

The present invention relates to a sensor controller, and particularly, to a sensor controller with a transmission function of an uplink signal.

Description of the Related Art

Among tablet terminals corresponding to pen input using a stylus, there is a tablet terminal in which a sensor controller that detects a position of the stylus can transmit an uplink signal to the stylus (for example, see WO 2017/029836 A1). The uplink signal is a signal for transmitting information from the sensor controller to the stylus, and the stylus executes a process, such as starting an operation and transmitting a pen signal, in response to the uplink signal.

The sensor controller detects a pen signal to detect the stylus, and it is preferable to complete new detection (or discovery) of the stylus before the stylus touches a panel surface of sensor electrodes. Therefore, the stylus carries out a detection operation of the uplink signal even when the stylus is not in contact with the panel surface (hover state), and the stylus transmits the pen signal in response to the detection of the uplink signal.

Considering a case in which the speed of the stylus approaching the panel surface is high, it is desirable that the stylus can detect the uplink signal at a stage where there is some distance to the panel surface. In order to achieve this detection of the uplink signal, there have been attempts to reduce the transmission period of the uplink signal, increase the transmission power of the uplink signal, improve the detection sensitivity of the stylus, and reduce the noise interfering with the uplink signal.

BRIEF SUMMARY

The stylus detects the uplink signal through capacitance formed between sensor electrodes arranged on the panel surface and pen tip electrodes provided at the pen tip of the stylus. In the detection, the stylus detects a change in potential of the pen tip electrodes with respect to a ground potential to thereby detect the uplink signal. The ground potential is usually a potential of a human body holding the stylus.

However, the detection of the uplink signal may fail in the detection method, and the method needs to be improved. More specifically, when, for example, the user holds the stylus with the right hand and puts the left hand on the panel surface, the uplink signal is also detected on the left hand through the capacitance formed between the left hand and the sensor electrodes. Consequently, the potential of the human body (that is, ground potential of stylus) changes in the same way as the uplink signal, and the change in the potential of the pen tip electrodes is cancelled. As a result, the stylus cannot detect the uplink signal.

Therefore, according to one aspect of the present invention, a sensor controller is provided that can prevent a situation in which a stylus cannot detect an uplink signal due to a change in the ground potential of the stylus caused by the uplink signal.

In addition, not only the sensor electrodes, but also electrodes for display apparatus (common electrodes and pixel electrodes, collectively referred to as "display electrodes") are arranged on the panel surface of the tablet terminal. Capacitance is also formed between the sensor electrodes and the display electrodes, and the uplink signal transmitted from the sensor electrodes is also detected on the display electrodes through the capacitance. As a result, contents of display of the display apparatus may be disturbed. Similarly, the uplink signal is also detected on each of electrodes of other apparatuses, such as a speaker, a near field communication (NFC) communication apparatus, a complementary metal-oxide semiconductor (CMOS) camera, and a wireless local area network (LAN) antenna, arranged near the panel surface, and the operations of the apparatuses may be disturbed.

Therefore, according to another aspect of the present invention, a sensor controller is provided that can prevent an uplink signal from affecting the operation of another apparatus.

According to various embodiments, a sensor controller is provided to be connected to a sensor electrode group configuring a surface. The sensor controller supplies a determined (predetermined) alternating current (AC) signal to one or more AC signal transmission electrodes that form part of a plurality of sensor electrodes included in the sensor electrode group. The sensor controller transmits, from each of cancellation signal transmission electrodes different from the AC signal transmission electrodes, a cancellation signal configured to prevent a signal transmitted from the AC signal transmission electrodes from appearing in a ground terminal of a detection circuit of a stylus.

According to another aspect of the present invention, the sensor controller is provided, in which the cancellation signal is a reverse phase signal of the AC signal.

Various embodiments of the present invention facilitate preventing the predetermined AC signal (uplink signal) from changing the ground potential of the stylus, which in turn facilitate preventing the situation in which the stylus cannot detect the uplink signal due to the change in the ground potential.

According to a further aspect of the present invention, the AC signal (uplink signal) may be prevented from appearing in the electrodes of another apparatus, such as a display apparatus, which in turn facilitates preventing the uplink signal from affecting the operation of another apparatus.

BRIEF DESCRIPTION OF THE SEVERAL VIEWS OF THE DRAWINGS

FIG. 4 depicts a configuration of an uplink signal;

FIG. 17 is a diagram describing a specific method for reducing current consumption in transmitting a signal, according to the first embodiment of the present invention;

DETAILED DESCRIPTION

Embodiments of the present invention will now be described in detail with reference to the attached drawings.

Figure 1:
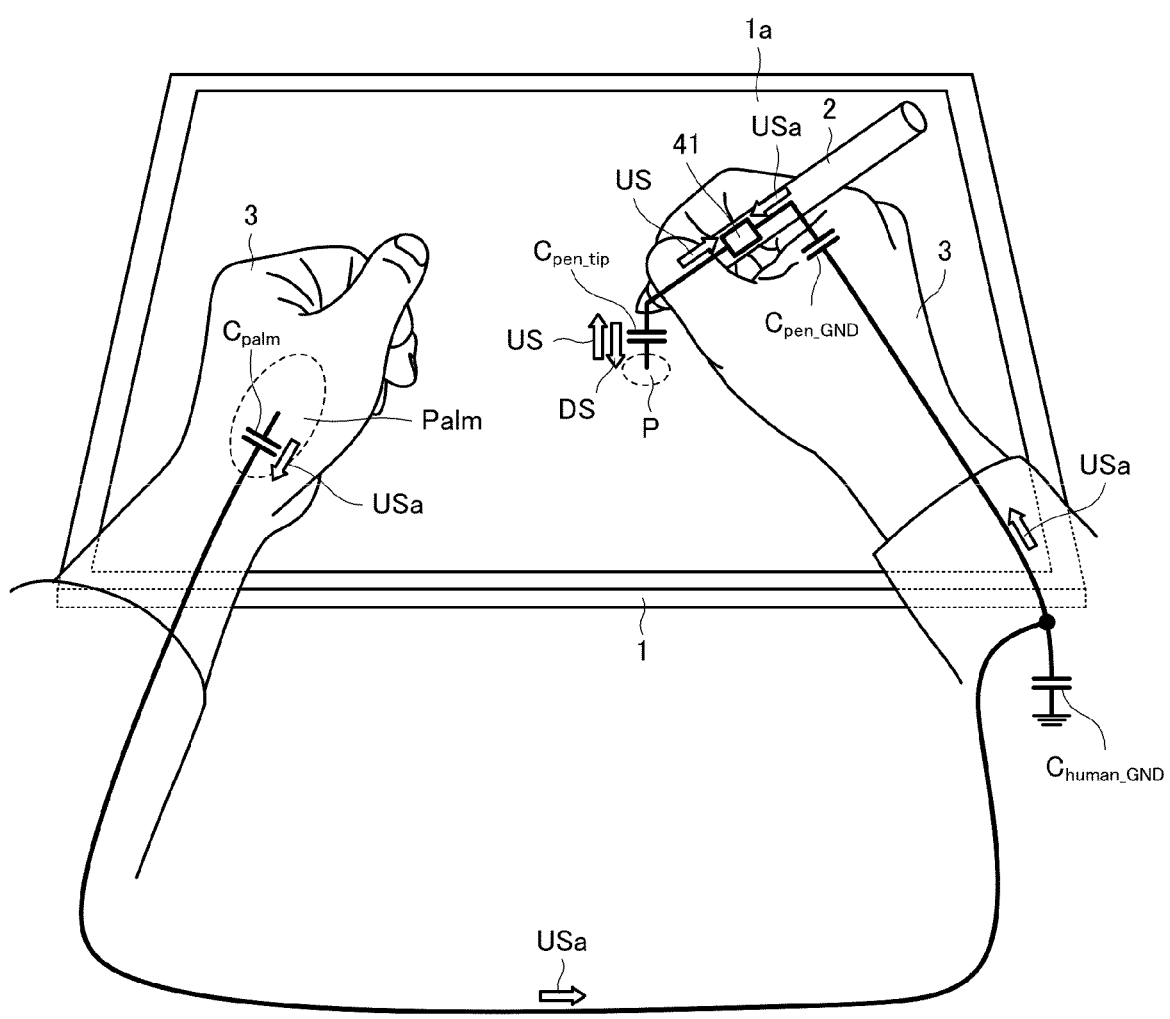
FIG. 1 depicts a use state of a tablet terminal and a stylus according to a first embodiment of the present invention.
Figure 2:
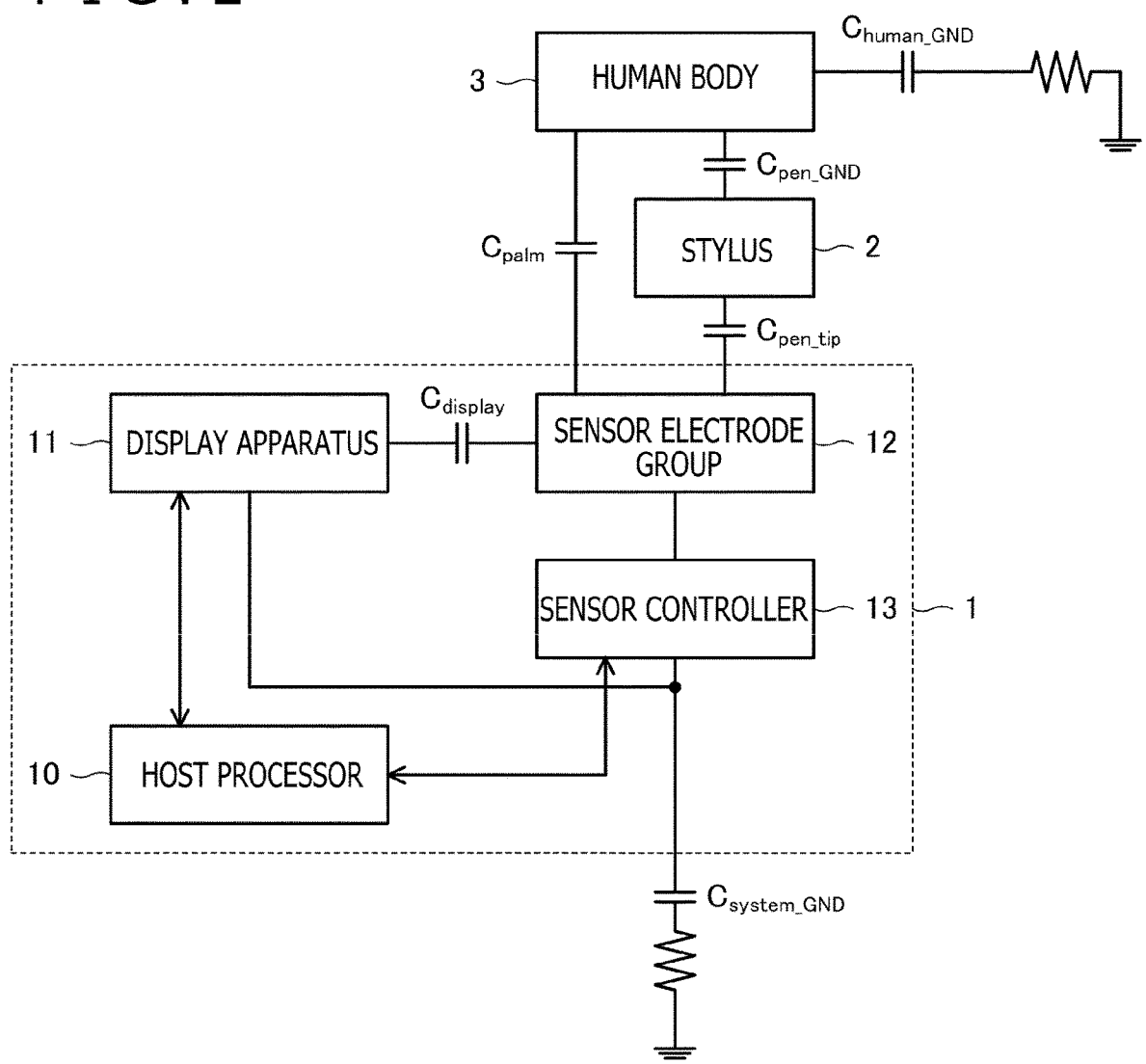
FIG. 2 depicts an internal configuration of the tablet terminal illustrated in FIG. 1 and an equivalent circuit of the tablet terminal and the stylus.

FIG. 1 depicts a use state of a tablet terminal 1 and a stylus 2 according to a first embodiment of the present invention. FIG. 2 depicts an internal configuration of the tablet terminal 1 illustrated in FIG. 1 and an equivalent circuit of the tablet terminal 1 and the stylus 2. An outline of the present invention will be described first with reference to the drawings.

As illustrated in FIG. 2, the tablet terminal 1 includes a host processor 10, a display apparatus 11, a sensor electrode group 12, and a sensor controller 13. Among these, the host processor 10 is a processor that controls the entire tablet terminal 1, and operations of the components in the tablet terminal 1 described later are executed under the control of the host processor 10.

The display apparatus 11 is a display that can display arbitrary information according to the control of the host processor 10. Various displays, such as a liquid crystal display, an organic electro-luminescence (EL) display, and electronic paper, can be used as the display apparatus 11. Although not illustrated, the display apparatus 11 includes the display electrodes described above (common electrodes and pixel electrodes). The common electrodes among the display electrodes are electrodes for supplying a common potential Vcom to each pixel and are provided throughout the entire surface of a panel surface 1a illustrated in FIG. 1.

The sensor electrode group 12 includes a plurality of transparent conductors (sensor electrodes 12X and 12Y illustrated in FIG. 3 described later) arranged on a display surface of the display apparatus 11. The sensor electrode group 12 is also provided throughout the entire panel surface 1a, and this allows detection of the position of an indicator, such as the stylus 2 and a finger of a user, on the entire panel surface 1a.

The sensor controller 13 is an apparatus that uses the sensor electrode group 12 to detect the position of the indicator, such as the stylus 2 and the finger of the user, in the panel surface 1a and that receives data transmitted from the stylus 2. The sensor controller 13 is configured to output the detected position and the data received from the stylus 2 to the host processor 10.

An outline of the part regarding the stylus 2 in the process of the sensor controller 13 will be described. The sensor controller 13 uses the sensor electrode group 12 as an antenna to transmit an uplink signal US to the stylus 2 and receive a pen signal DS from the stylus 2 as illustrated in FIG. 1. The pen signal DS here is a signal transmitted from the stylus 2 in response to the uplink signal US, and the pen signal DS includes a burst signal that is an unmodulated carrier wave signal and includes a data signal that is a carrier wave signal modulated based on data, whose transmission is instructed by a command COM (described later) included in the uplink signal US. The sensor controller 13 is configured to calculate the position of the stylus 2 from the reception position of the received burst signal and decode the received data signal to receive the data transmitted from the stylus 2.

As illustrated in FIG. 2, each component in the tablet terminal 1, the stylus 2, and a human body 3 of the user holding the stylus 2 are electrically connected to each other through electrostatic coupling. More specifically, the stylus 2 is first electrically connected to the sensor electrode group 12 through illustrated capacitance $C_{pen\_tip}$ at pen tip electrodes and is electrically connected to the human body 3 through illustrated capacitance $C_{pen\_GND}$ at a housing. The sensor electrode group 12 is also electrically connected to, in addition to the stylus 2, the display electrodes in the display apparatus 11 through illustrated capacitance $C_{display}$. The sensor electrode group 12 is further electrically connected to the human body 3 through illustrated capacitance $C_{palm}$ when, for example, part of the human body 3 (typically, hand) is in contact with or close to the panel surface 1a.

The human body 3 is grounded through illustrated capacitance $C_{human\_GND}$, and the sensor controller 13 and the display apparatus 11 are commonly grounded through capacitance $C_{system}$ GND generated between the ground of the housing and the earth.

A detection unit 41 (detection circuit) with a function of detecting the uplink signal US is provided in the stylus 2 as illustrated in FIG. 1. Details of the detection unit 41 will be described later with reference to FIG. 6. An input end of the detection unit 41 is connected to the pen tip electrodes through wiring in the stylus 2, and therefore, the detection unit 41 is electrically connected to the sensor electrode group 12 through the capacitance $C_{pen\_tip}$. A ground terminal of the detection unit 41 is connected to the housing of the stylus 2, and therefore, the detection unit 41 is grounded through the capacitance $C_{pen\_GND}$ and the capacitance $C_{human\_GND}$.

The uplink signal US sent out from the sensor electrode group 12 is transmitted to the detection unit 41 through the capacitance $C_{pen\_tip}$ and the pen tip electrodes. The capacitance $C_{pen\_tip}$ is formed not only when the pen tip of the stylus 2 and the panel surface 1a are in contact with each other, but is also formed even when there is some distance between them. Therefore, the stylus 2 can receive the uplink signal US even in a state in which the pen tip is separated from the panel surface 1a (hover state). The sensor controller 13 uses this configuration to detect the stylus 2 before the stylus 2 touches the panel surface 1a. A position P illustrated in FIG. 1 indicates the position of the stylus 2 in the hover state detected in this way.

Here, as illustrated in FIG. 1, the user may hold the stylus 2 with one hand (right hand in FIG. 1) and place the other hand (left hand in FIG. 1) on the panel surface 1a to carry out an input operation to the tablet terminal 1 using the stylus 2. In the example of FIG. 1, an illustrated region Palm indicates a contact portion of the left hand and the panel surface 1a. In this case, not only the pen tip electrodes of the stylus 2, but also the other hand placed on the panel surface 1a receives the uplink signal US. In FIG. 1, the uplink signal US is written as an uplink signal USa for the distinction from the uplink signal US detected by the pen tip electrodes. The uplink signal USa is supplied to the ground terminal of the detection unit 41 through the human body 3 and the capacitance $C_{pen\_GND}$ as illustrated in FIG. 1. As a result, the uplink signal US is supplied to both of the input end and the ground terminal, and it becomes difficult for the detection unit 41 to detect the uplink signal US. In addition to the case in which the other hand is placed on the panel surface 1a, a similar phenomenon may occur when, for example, the hand grasping the stylus 2 comes into contact with or close to the panel surface 1a and receives the uplink signal USa.

The uplink signal US sent out from the sensor electrode group 12 is detected not only by the stylus 2, but also by the display electrodes in the display apparatus 11 through the capacitance $C_{display}$ illustrated in FIG. 2. As a result, the potential of the display electrodes fluctuates, and contents of display of the display apparatus 11 is disturbed. Particularly, the common electrodes are provided throughout the entire panel surface 1a as described above, and the common electrodes may be significantly affected by the uplink signal US.

Various embodiments of the present embodiment may facilitate solving these problems. Specifically, various embodiments may prevent a situation in which the stylus 2 cannot detect the uplink signal US due to the change in the potential of the ground terminal of the stylus 2 caused by the uplink signal US and may prevent the uplink signal US from affecting the operation of the display apparatus 11. Hereinafter, configurations of various embodiments will be described in detail.

Figure 3:
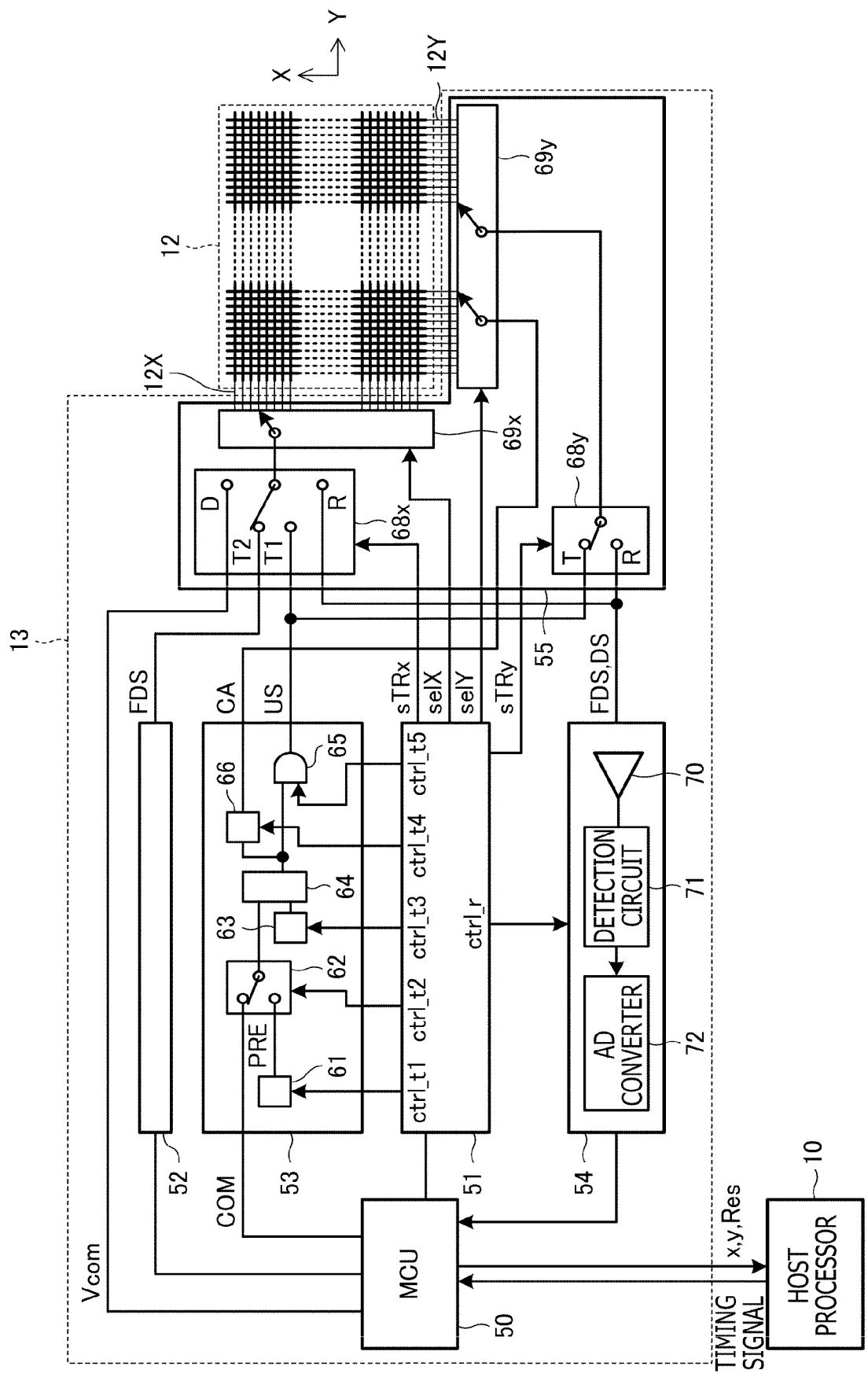
FIG. 3 depicts internal configurations of a sensor electrode group and a sensor controller illustrated in FIG. 2.

FIG. 3 depicts internal configurations of the sensor electrode group 12 and the sensor controller 13.

The sensor electrode group 12 configures a mutual-capacitance touch sensor. The sensor electrode group 12 includes a plurality of sensor electrodes 12X (second sensor electrodes) and a plurality of sensor electrodes 12Y (first sensor electrodes) arranged in a matrix. The plurality of sensor electrodes 12X are transparent conductors extending in a Y direction (first direction) and arranged at regular intervals in an X direction (second direction) orthogonal to the Y direction. The plurality of sensor electrodes 12Y are transparent conductors extending in the X direction and arranged at regular intervals in the Y direction. Note that although the sensor electrodes 12X and 12Y are linear conductors in the example illustrated here, the sensor electrode group 12 can also be configured by conductors in other shapes. For example, the sensor electrode group 12 may include a plurality of rectangular conductors two-dimensionally arranged to allow detection of two-dimensional coordinates of the stylus 2 (see FIG. 16 described later).

One of the sensor electrodes 12X and 12Y can also be used as common electrodes in the display apparatus 11. The type of the tablet terminal 1 that uses one of the sensor electrodes 12X and 12Y as common electrodes in the display apparatus 11 is called, for example, an "in-cell type." On the other hand, the type of the tablet terminal 1 in which the sensor electrodes 12X and 12Y and the common electrodes in the display apparatus 11 are separately provided is called, for example, an "out-cell type" or an "on-cell type." Although the tablet terminal 1 is regarded as the in-cell type in the following description, the present invention can be similarly applied to the out-cell type or on-cell type tablet terminal. Although the sensor electrodes 12X are used as common electrodes in the following description, the sensor electrodes 12Y may be used as common electrodes.

When the display apparatus 11 executes a driving process of pixels, the potential of the common electrodes needs to be maintained at a predetermined value (specifically, the common potential Vcom described above). Therefore, in the in-cell type tablet terminal 1, the sensor controller 13 cannot communicate with the stylus 2 or detect the finger while the display apparatus 11 is executing the driving process of the pixels. Thus, the host processor 10 uses a horizontal blanking interval and a vertical blanking interval in which the driving process of the pixels is not executed, thereby causing the sensor controller 13 to communicate with the stylus 2 and detect the finger. Specifically, the host processor 10 uses the horizontal blanking interval and the vertical blanking interval as time slots and controls the sensor controller 13 to communicate with the stylus 2 and detect the finger in the time slots.

The sensor controller 13 includes a micro controller unit (MCU) 50, a logic unit 51, transmission units 52 and 53, a reception unit 54, and a selection unit 55 as illustrated in FIG. 3.

The MCU 50 and the logic unit 51 are control units that control the transmission units 52 and 53, the reception unit 54, and the selection unit 55 to thereby control transmission and reception operations of the sensor controller 13. More specifically, the MCU 50 includes a read-only memory (ROM) and a random access memory (RAM), and is a microprocessor that executes programs stored in the ROM and the RAM to perform various operations. The MCU 50 also has a function of outputting the common potential Vcom and the command COM indicating an order to the stylus 2. Meanwhile, the logic unit 51 is configured to output control signals ctrl_t1 to ctrl_t5, ctrl_r, sTRx, sTRy, selX, and selY based on the control of the MCU 50. The transmission unit 52 is a circuit that generates a finger detection signal FDS used for detecting the finger according to the control of the MCU 50. Although described in detail later, in addition to the finger of the user, the hand (palm) of the user is also the detection target based on the finger detection signal FDS in the present embodiment. The finger detection signal FDS may be, for example, an unmodulated pulse train signal or sine wave signal.

The transmission unit 53 is a circuit that generates an uplink signal US and a cancellation signal CA according to the control of the MCU 50 and the logic unit 51. Although the details of the uplink signal US and the cancellation signal CA will be described later, the outline will be described here. The uplink signal US according to the present embodiment is a signal including the command COM as well as a preamble PRE for the stylus 2 to detect the uplink signal US. The cancellation signal CA is a signal configured to prevent the uplink signal US from appearing in the ground terminal of the detection unit 41 (see FIG. 1) of the stylus 2 and is, for example, a reverse phase signal of the uplink signal US.

The transmission unit 53 includes a preamble supply unit 61, a switch 62, a code sequence holding unit 63, a spread processing unit 64, a transmission guard unit 65, and a cancellation signal generation unit 66. Note that among these, the preamble supply unit 61 may be included in the MCU 50.

The preamble supply unit 61 holds the preamble PRE and has a function of outputting the preamble PRE according to the instruction of the control signal ctrl tl supplied from the logic unit 51. The preamble PRE output by the preamble supply unit 61 is supplied to the switch 62. The command COM is also supplied to the switch 62 from the MCU 50.

Figure 4:
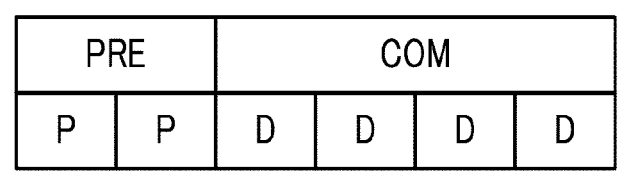

FIG. 4 depicts a configuration of the uplink signal US. As illustrated in FIG. 4, the uplink signal US includes the preamble PRE arranged at the beginning, followed by the command COM (data section). The stylus 2 is notified of contents of the preamble PRE in advance to allow the stylus 2 to detect the preamble PRE. On the other hand, the command COM is data indicating an order (command) to the stylus 2 as described above. Specific examples of contents of the order in the command COM include transmission of pen pressure data indicating the pressure applied to the pen tip, transmission of data indicating a press state of a switch (not illustrated) provided on the surface of the stylus 2, and transmission of a stylus ID stored in advance in the stylus 2.

Each of the preamble PRE and the command COM includes a combination of values of a plurality of symbols. The symbol is a unit of information associated with one spreading code, and there are a symbol corresponding to a bit sequence and a symbol not corresponding to the bit sequence. The former symbol includes, for example, one of sixteen types of symbols associated with spreading codes different from each other, and the sixteen types of symbols are associated with four-digit bit sequences "0000" to "1111," respectively. Hereinafter, this type of symbol will be collectively referred to as symbol D. The latter symbol includes one of two types of symbols associated with spreading codes in reverse phases. Hereinafter, the two types of symbols will be referred to as symbol P and symbol M. In the example of FIG. 4, the preamble PRE includes two consecutive symbols P, and the command COM includes four consecutive symbols D (that is, 16-bit data). The description will be continued based on this arrangement.

Returning to FIG. 3, the switch 62 has a function of selecting one of the preamble supply unit 61 and the MCU 50 according to the control signal ctrl_t2 supplied from the logic unit 51 and supplying the output of the selected one to the spread processing unit 64. When the switch 62 selects the preamble supply unit 61, the preamble PRE is supplied to the spread processing unit 64. On the other hand, when the switch 62 selects the MCU 50, the command COM is supplied to the spread processing unit 64.

The code sequence holding unit 63 has a function of generating and holding, for example, an 11-chip spreading code with autocorrelation characteristics based on the control signal ctrl_t3 supplied from the logic unit 51. The spreading code held by the code sequence holding unit 63 is supplied to the spread processing unit 64.

The spread processing unit 64 has a function of modulating the spreading code held by the code sequence holding unit 63 based on the value of the symbol supplied through the switch 62. The modulation is performed based on the cyclic shift illustrated in, for example, International Publication No. WO 2017/029836, and in this case, a 12-chip spreading code is output for each symbol as a result of the modulation.

The spreading codes output from the spread processing unit 64 are sequentially supplied to the transmission guard unit 65 and the cancellation signal generation unit 66. Of these, the transmission guard unit 65 plays a role of inserting a guard period, which is a period without transmission and reception, between a transmission period of the uplink signal US and a period of the reception unit 54 performing a reception operation described later, based on the control signal ctrl t5 supplied from the logic unit 51.

The cancellation signal generation unit 66 is a functional unit that generates the cancellation signal CA based on the spreading code output from the spread processing unit 64. The cancellation signal generation unit 66 is configured to output the cancellation signal CA based on the control signal ctrl_t4 supplied from the logic unit 51. More specifically, the cancellation signal generation unit 66 is configured to output the cancellation signal CA only in a period in which the output is instructed by the control signal ctrl_t4.

Figure 5:
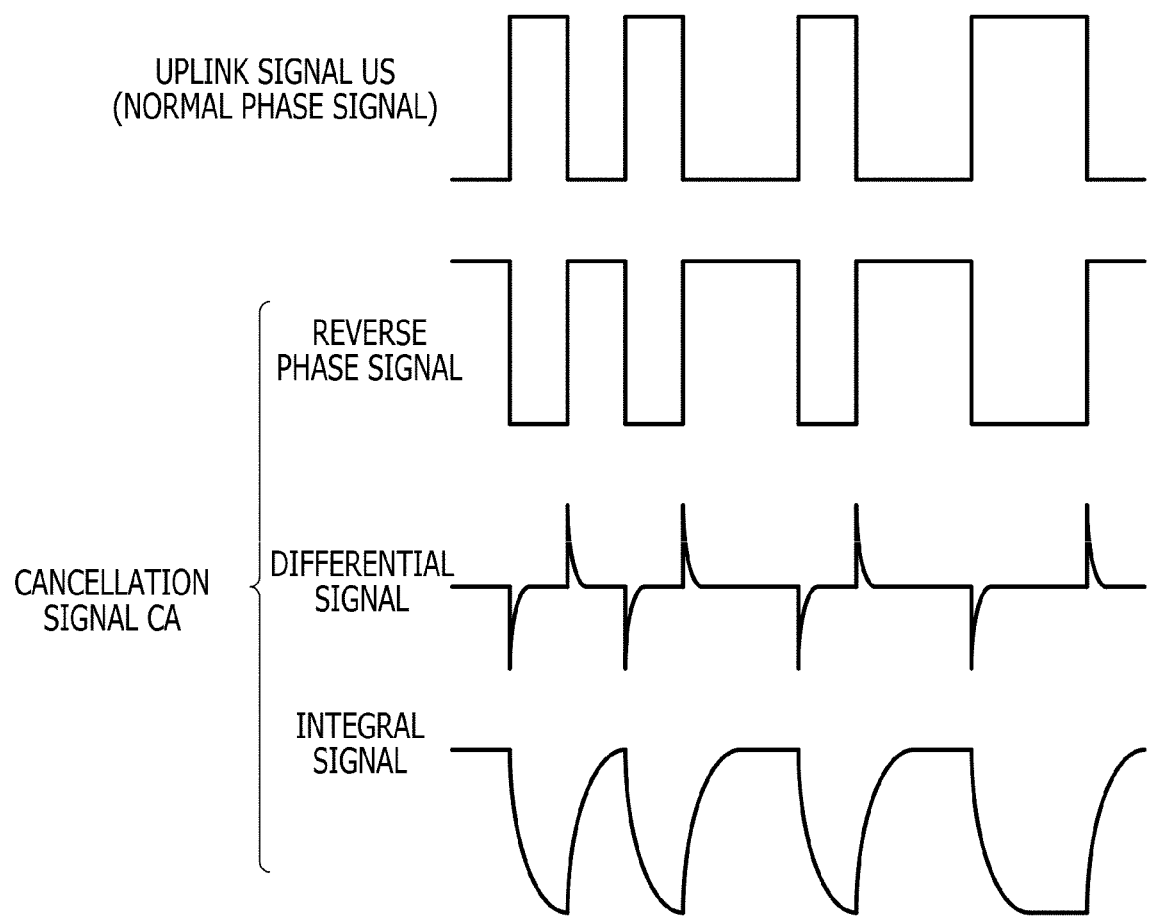
FIG. 5 depicts an example of waveforms of the uplink signal and a cancellation signal.

FIG. 5 depicts an example of waveforms of the uplink signal US and the cancellation signal CA. As illustrated in FIG. 5, the uplink signal US in the form of spreading code is an AC signal of a square wave with high or low value. The cancellation signal CA is a signal for expanding, compared to the uplink signal US, the potential difference between the potential (or the change direction of the potential) at the input end of the detection unit 41 (on the pen tip electrode side) of the stylus 2 and the potential (or the change direction of the potential) at the ground terminal of the detection unit 41. The signal for expanding the potential difference compared to the uplink signal US is typically a reverse phase signal obtained by reversing the phase of the uplink signal US as illustrated in FIG. 5. However, the reception signal of the stylus 2 may be a differential signal or an integral signal of the uplink signal US depending on specific configurations of the transmission circuit of the tablet terminal 1 and the reception circuit of the stylus 2. In these cases, the cancellation signal CA is preferably a differential signal or an integral signal of the reverse phase signal of the uplink signal US as illustrated in FIG. 5. Compared to the case of transmitting the uplink signal US to all of the electrodes, it is only necessary to generate a potential difference between the input end and the ground terminal of the detection unit 41 of the stylus 2. Therefore, a predetermined AC signal can be transmitted for the uplink signal US, and a signal with a predetermined potential (for example, ground potential) can be used as a cancellation signal. Furthermore, the cancellation signal CA need not be a completely reverse phase signal of the uplink signal US. For example, the cancellation signal CA may be a signal obtained by slightly shifting the phase of the completely reverse phase signal of the uplink signal US, and the waveform need not be completely the same waveform. The cancellation signal CA may also be formed by a combination of a plurality of types of signals. For example, the cancellation signal CA may be formed by a combination of two types of signals obtained by shifting the phase of the uplink signal by, for example, 120 degrees and 240 degrees. In this case, the two types of cancellation signals CA are preferably transmitted at the same time from different regions in the panel surface 1a when the sensor controller 13 transmits the cancellation signals CA, as described later.

Returning to FIG. 3, the reception unit 54 is a circuit that receives the pen signal DS transmitted from the stylus 2 and the finger detection signal FDS transmitted from the transmission unit 52 based on the control signal ctrl_r of the logic unit 51. Specifically, the reception unit 54 includes an amplification circuit 70, a detection circuit 71, and an analog-digital (AD) converter 72.

The amplification circuit 70 amplifies and outputs the pen signal DS or the finger detection signal FDS supplied from the selection unit 55. The detection circuit 71 is a circuit that generates a voltage corresponding to the level of the output signal of the amplification circuit 70. The AD converter 72 is a circuit that samples the voltage output from the detection circuit 71 at predetermined time intervals to generate a digital signal. The digital signal output by the AD converter 72 is supplied to the MCU 50. The MCU 50 detects the position of the stylus 2 or the finger (palm) and acquires data Res transmitted from the stylus 2 based on the supplied digital signal. The MCU 50 successively outputs coordinates x and y indicating the detected position and the acquired data Res to the host processor 10.

The selection unit 55 includes switches 68x and 68y and conductor selection circuits 69x and 69y.

The switch 68y is a switch element configured to connect a common terminal and one of a T terminal and an R terminal. The common terminal of the switch 68y is connected to the conductor selection circuit 69y. The T terminal is connected to an output end of the transmission unit 53, and the R terminal is connected to an input end of the reception unit 54. The switch 68x is a switch element configured to connect a common terminal and one of a T1 terminal, a T2 terminal, a D terminal, and an R terminal. The common terminal of the switch 68x is connected to the conductor selection circuit 69x. The T1 terminal is connected to the output end of the transmission unit 53, and the T2 terminal is connected to an output end of the transmission unit 52. The D terminal is connected to an output end of the MCU 50 that outputs the common potential Vcom, and the R terminal is connected to the input end of the reception unit 54.

The conductor selection circuit 69x is a switch terminal that selectively connects the plurality of sensor electrodes 12X to the common terminal of the switch 68x. The conductor selection circuit 69x can also connect part or all of the plurality of sensor electrodes 12X to the common terminal of the switch 68x at the same time.

The conductor selection circuit 69y is a switch element that selectively connects the plurality of sensor electrodes 12Y to the common terminal of the switch 68y or the output end of the cancellation signal CA of the transmission unit 53. The conductor selection circuit 69y can also connect part or all of the plurality of sensor electrodes 12Y to the common terminal of the switch 68y or the output end of the cancellation signal CA of the transmission unit 53 at the same time. Note that the control of the logic unit 51 described later prevents connection of one sensor electrode 12Y to both of the common terminal of the switch 68y and the output end of the cancellation signal CA of the transmission unit 53 at the same time.

The four control signals sTRx, sTRy, selX, and selY are supplied from the logic unit 51 to the selection unit 55. Specifically, the control signal sTRx is supplied to the switch 68x, and the control signal sTRy is supplied to the switch 68y. The control signal selX is supplied to the conductor selection circuit 69x, and the control signal selY is supplied to the conductor selection circuit 69y. The logic unit 51 uses the control signals sTRx, sTRy, selX, and selY to control the selection unit 55, to thereby realize the transmission of the uplink signal US or the finger detection signal FDS, the application of the common potential Vcom, and the reception of the pen signal DS or the finger detection signal FDS. The logic unit 51 further uses the control signal ctrl t4 to control the operation of the cancellation signal generation unit 66 to thereby realize the transmission of the cancellation signal CA.

Hereinafter, how the selection unit 55 and the cancellation signal generation unit 66 are controlled by the logic unit 51 and how the MCU 50 operates in response to the control will be described in detail for a case of detecting the finger and the palm, a case of executing a pixel driving operation, a case of transmitting the uplink signal US and the cancellation signal CA, and a case of receiving the pen signal DS, respectively.

First, the logic unit 51 in detecting the finger and the palm controls the switch 68x to connect the T2 terminal to the common terminal and controls the switch 68y to connect the R terminal to the common terminal. The logic unit 51 further controls the conductor selection circuits 69x and 69y to sequentially select the combinations of the plurality of sensor electrodes 12X and 12Y. In this way, the reception unit 54 sequentially receives the finger detection signals FDS passed through a plurality of intersection points of the plurality of sensor electrodes 12X and 12Y. The control will be referred to as "touch scan." The MCU 50 detects the positions of the finger and the palm on the panel surface 1a based on the reception strength of the finger detection signals FDS sequentially received in the touch scan. More specifically, the MCU 50 calculates the area of a region including consecutive intersection points in which the reception strength of the finger detection signal FDS is equal to or greater than a predetermined value. The MCU 50 detects the position of the finger when the obtained area is equal to or smaller than a predetermined value, and detects the position of the palm otherwise. Note that the position of the palm may be expressed by an extended region instead of a point.

Next, the logic unit 51 in executing the pixel driving operation controls the switch 68x to connect the D terminal to the common terminal and controls the conductor selection circuit 69x to connect all of the plurality of sensor electrodes 12X to the switch 68x at the same time. As a result, the common potential Vcom is supplied from the MCU 50 to each sensor electrode 12X, and the display apparatus 11 can execute the pixel driving operation. Note that the MCU 50 causes the logic unit 51 to execute the control at timing based on a timing signal supplied from the host processor 10.

Next, the logic unit 51 in transmitting the uplink signal US and the cancellation signal CA controls the switch 68x to connect the R terminal to the common terminal and controls the switch 68y to connect the T terminal to the common terminal. As a result, the uplink signal US output from the transmission unit 53 is supplied to the conductor selection circuit 69y. The logic unit 51 further causes the sensor electrodes 12 to connect to the conductor selection circuit 69y, with a predetermined number of sensor electrodes 12Y at a time sequentially connected to the common terminal of the switch 68y. As a result, the uplink signals US are transmitted from the predetermined number of sensor electrodes 12Y connected to the common terminal of the switch 68y, and the uplink signals US are eventually transmitted from all of the sensor electrodes 12Y.

The logic unit 51 also executes a process of transmitting the cancellation signal CA at the same time as the transmission of the uplink signal US. Specifically, the logic unit 51 controls the cancellation signal generation unit 66 to output the cancellation signal at timing of the transmission of the uplink signal US and controls the conductor selection circuit 69y to connect a predetermined number of sensor electrodes 12Y to the output end of the cancellation signal CA of the transmission unit 53. However, the logic unit 51 controls the conductor selection circuit 69y such that the sensor electrodes 12Y connected to the common terminal of the switch 68y are not connected to the output end of the cancellation signal CA of the transmission unit 53. This realizes the transmission of the cancellation signal CA at the same time as the transmission of the uplink signal US. This will be described in more detail later with reference to a processing flow diagram.

Lastly, the logic unit 51 in receiving the pen signal DS controls the switches 68x and 68y to connect the R terminals to the common terminals. The method of controlling the conductor selection circuits 69x and 69y varies between the case of detecting the position of the stylus 2 and the case of receiving the data signal transmitted from the stylus 2. The former case will be described in detail later with reference to FIG. 8. For the latter case, the logic unit 51 controls the conductor selection circuits 69x and 69y to select only a predetermined number of (for example, one) sensor electrodes 12X and 12Y near the latest (most recently) detected position among the plurality of sensor electrodes 12X and 12Y. The data signals received by the predetermined number of selected sensor electrodes are supplied to the MCU 50 through the reception unit 54. The MCU 50 demodulates and decodes the data signals supplied in this way to acquire the data Res.

Figure 6:
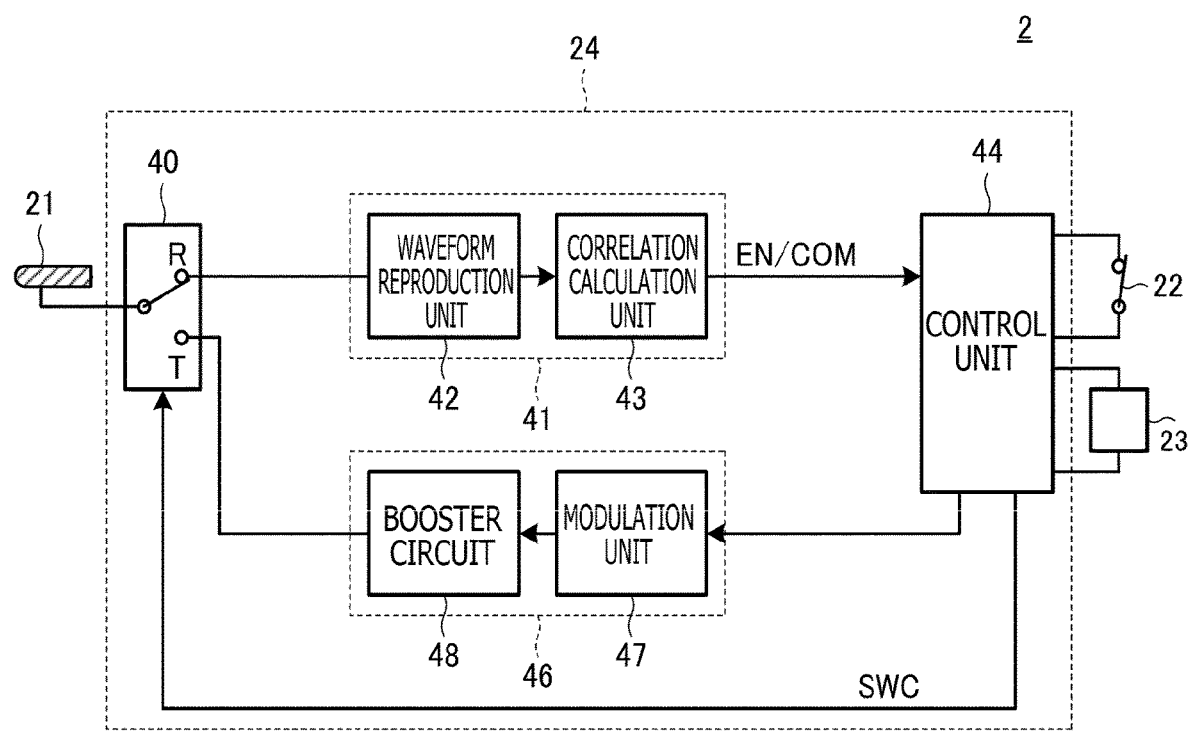
FIG. 6 depicts an internal configuration of the stylus illustrated in FIG. 1.

FIG. 6 depicts an internal configuration of the stylus 2. As illustrated in FIG. 6, the stylus 2 includes an electrode 21, a switch 22, a pen pressure detection sensor 23, and a signal processing unit 24.

The electrode 21 is a conductive member configuring the pen tip of the stylus 2. The electrode 21 plays a role of an antenna for transmitting the pen signal DS and also plays a role of an antenna for receiving the uplink signal US transmitted from the sensor controller 13 through the sensor electrode group 12. Note that a member configuring the pen tip may be provided separately from the electrode 21. In addition, an electrode that transmits the pen signal DS and an electrode that receives the uplink signal US may be separately provided.

The switch 22 is a switch, such as a side switch provided on the side surface of the stylus 2 and a tail switch provided at the back end portion, which may be turned on and off by the operation of the user. The pen pressure detection sensor 23 is a pressure sensor for detecting the pressure (pen pressure) applied to the pen tip of the stylus 2. Specifically, a well-known technique, such as a variable capacitor in which the capacitance changes according to the pressure and a pressure sensor in which the resistance value changes according to the pressure, can be used for the pen pressure detection sensor 23.

The signal processing unit 24 has a function of receiving the uplink signal US from the sensor controller 13 through the electrode 21 and executing a process according to contents of the uplink signal US, and a function of generating the pen signal DS to be transmitted to the sensor controller 13 and transmitting the pen signal DS toward the sensor controller 13 through the electrode 21. Specifically, the signal processing unit 24 functionally includes a switch unit 40, the detection unit 41, a control unit 44, and a transmission unit 46. These components will be sequentially described.

The switch unit 40 is a single-pole double-throw switch element in which a common terminal and one of a T terminal and an R terminal are connected. The common terminal of the switch 40 is connected to the electrode 21. The T terminal is connected to an output end of the transmission unit 46, and the R terminal is connected to an input end of the detection unit 41. The state of the switch unit 40 is controlled by a control signal SWC from the control unit 44. The control unit 44 uses the control signal SWC to control the switch unit 40 to connect the R terminal and the common terminal to receive the uplink signal US from the sensor controller 13. The control unit 44 uses the control signal SWC to control the switch unit 40 to connect the T terminal and the common terminal to transmit the pen signal DS to the sensor controller 13.

The detection unit 41 is a circuit that detects a signal supplied from the switch unit 40 (signal arriving at the electrode 21) and that decodes a code sequence included in the detected signal. In the example, the detection unit 41 includes a waveform reproduction unit 42 and a correlation calculation unit 43. The detection unit 41 can detect the preamble PRE and the command COM as a result of the decoding.

The waveform reproduction unit 42 uses a clock several times (for example, four times) the chip rate of the spreading code used by the sensor controller 13 in spreading the uplink signal US to binarize the level of the charge (voltage) induced in the electrode 21. In this way, the waveform reproduction unit 42 adjusts the level to a binary sequence (chip sequence) with positive and negative polarity values and outputs the chip sequence. The correlation calculation unit 43 stores the chip sequence output by the waveform reproduction unit 42 in a register and sequentially shifts with the clock to calculate the correlation with each of the plurality of spreading codes that can be transmitted by the sensor controller 13, to thereby decode the chip sequence included in the reception signal. As a result of the decoding, one of the symbols P and M and sixteen types of symbols D is obtained.

The detection unit 41 successively performs a detection operation of the preamble PRE based on the decoding result of the correlation calculation unit 43. Specifically, the detection operation is an operation of determining whether or not two consecutive symbols P are acquired. At the same time as the determination, the detection unit 41 also determines whether or not two consecutive symbols M are detected. When the result of one of the determinations is affirmative, the detection unit 41 detects the existence of the sensor controller 13 and issues a start signal EN for starting the control unit 44 to the control unit 44.

The detection unit 41 that has issued the start signal EN then performs a detection operation of the command COM. Specifically, the detection unit 41 successively demodulates, into a bit sequence, the series of symbols D sequentially obtained by decoding. The detection unit 41 eventually obtains a bit sequence of 16 bits and outputs the bit sequence to the control unit 44. In this case, the detection unit 41 refers to the preamble PRE received earlier to demodulate the command COM. Specifically, when two consecutive symbols M are detected in the reception operation of the preamble PRE, the detection unit 41 reverses the chip sequence output from the waveform reproduction unit 42 and supplies the chip sequence to the correlation calculation unit 43. In this way, the uplink signal US can be correctly received even when the uplink signal US is reversed, and when the cancellation signal CA (for example, reverse phase signal of the uplink signal US) is received, the cancellation signal CA can be received as the uplink signal US.

The control unit 44 includes a microprocessor (MCU) and is started by the supply of the start signal EN from the detection unit 41. The started control unit 44 performs an operation instructed by the command COM supplied from the detection unit 41. The operation includes a process of transmitting the pen signal DS to the transmission unit 46. More specifically, the control unit 44 transmits an unmodulated carrier wave signal to the transmission unit 46 to cause the transmission unit 46 to transmit a burst signal. The control unit 44 also acquires data whose transmission is instructed by the command COM, and the control unit 44 supplies the data to the transmission unit 46 to cause the transmission unit 46 to transmit a data signal. As a result, the pen signal DS transmitted from the transmission unit 46 is a signal including the data whose transmission is instructed by the command COM.

The transmission unit 46 is a circuit that generates the pen signal DS according to the control by the control unit 44 and that supplies the pen signal DS to the electrode 21. The transmission unit 46 includes a modulation unit 47 and a booster circuit 48.

The modulation unit 47 is a circuit that generates a carrier signal (for example, square wave signal) with a predetermined frequency or with a frequency according to the control by the control unit 44 and that outputs the carrier signal without modulation or after modulation based on the control of the control unit 44. The modulation unit 47, in transmitting the burst signal, outputs the carrier signal without modulating the carrier signal according to the instruction of the control unit 44. Note that a burst signal may be a signal obtained by modulating the carrier signal using a pattern with known values, and the modulation unit 47 in that case modulates the carrier signal using the pattern with known values and outputs the signal. On the other hand, the modulation unit 47, in transmitting the data signal, modulates (such as OOK and PSK) the carrier signal using the data supplied from the control unit 44 and outputs a modulation signal obtained as a result of the modulation.

The booster circuit 48 is a circuit that raises the voltage of the output signal of the modulation unit 47 to a certain amplitude to thereby generate the pen signal DS. The pen signal DS generated by the booster circuit 48 is sent out to the space from the electrode 21 through the switch unit 40. Next, the transmission of the uplink signal US and the cancellation signal CA according to the present embodiment will be described in detail with reference to a processing flow diagram of the sensor controller 13.

Figure 7:
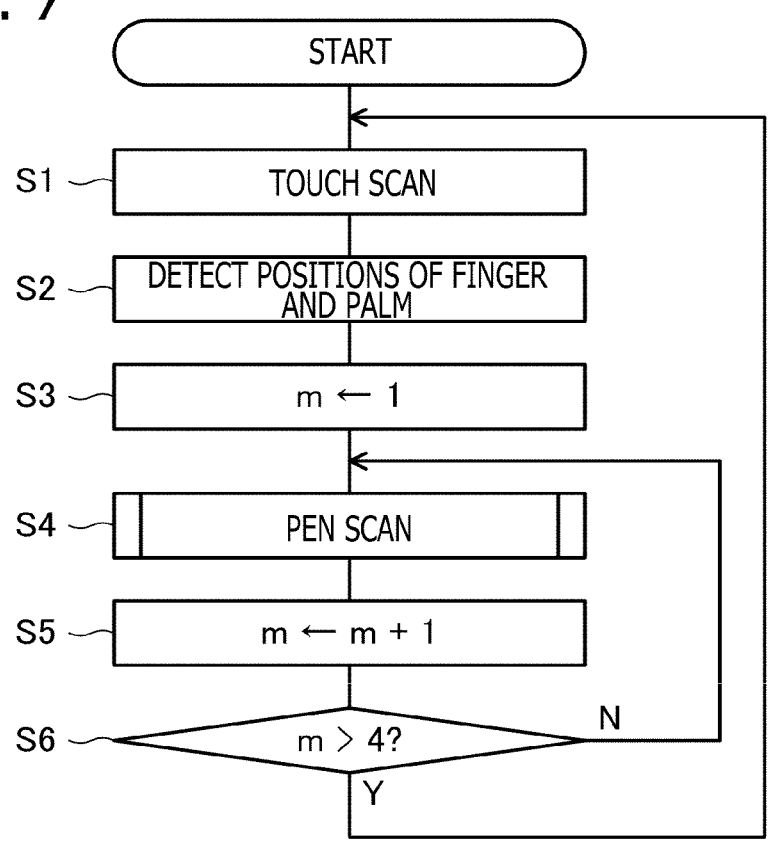
FIG. 7 is a flow diagram of a process executed by the sensor controller illustrated in FIG. 2.

FIG. 7 is a flow diagram of a process executed by the sensor controller 13. FIG. 7 illustrates only a process regarding the position detection of the finger, the palm, and the stylus 2.

As illustrated in FIG. 7, the sensor controller 13 first carries out the touch scan for detecting the finger and the palm (step S1) and detects the positions of the finger and the palm on the panel surface 1a based on the result of the touch scan (step S2). The details of the processes are as described above. Next, the sensor controller 13 assigns 1 to a variable m (step S3) and carries out a pen scan (step S4). The pen scan is a process for detecting the stylus 2, and the pen scan will be described in detail later with reference to FIG. 8.

The sensor controller 13 that has finished the pen scan adds 1 to the variable m (step S5) and determines whether or not the variable m exceeds 4. As a result, if the sensor controller 13 determines that the variable m does not exceed 4, the sensor controller 13 returns to step S4 and carries out the pen scan again. On the other hand, if the sensor controller 13 determines that the variable m exceeds 4, the sensor controller 13 returns to step S1 and carries out the touch scan.

According to the processes, the sensor controller 13 carries out the pen scan four times after carrying out the touch scan once, and the sensor controller 13 repeats the processes at this pace. Note that the pace is illustrative only, and the sensor controller 13 may repeat the processes at another pace, such as carrying out the pen scan once after carrying out the touch scan once. Although not illustrated in FIG. 7, when the stylus 2 is detected by the execution of the pen scan, the actual sensor controller 13 executes a reception operation of the data signal and acquires the data transmitted from the stylus 2.

Figure 8:
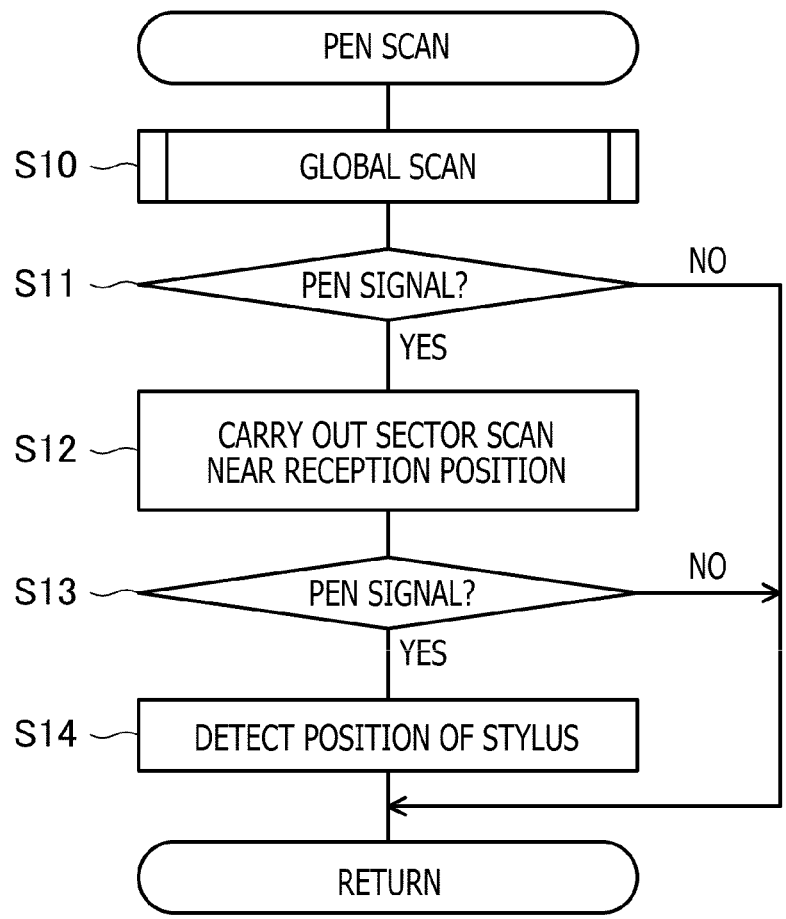
FIG. 8 is a detailed flow diagram of a pen scan illustrated in FIG. 7.

FIG. 8 is a detailed flow diagram of the pen scan. As illustrated in FIG. 8, the sensor controller 13 first carries out a global scan that is a process for determining one sensor electrode 12X and one sensor electrode 12Y closest to the stylus 2 (step S10).

Figure 9:
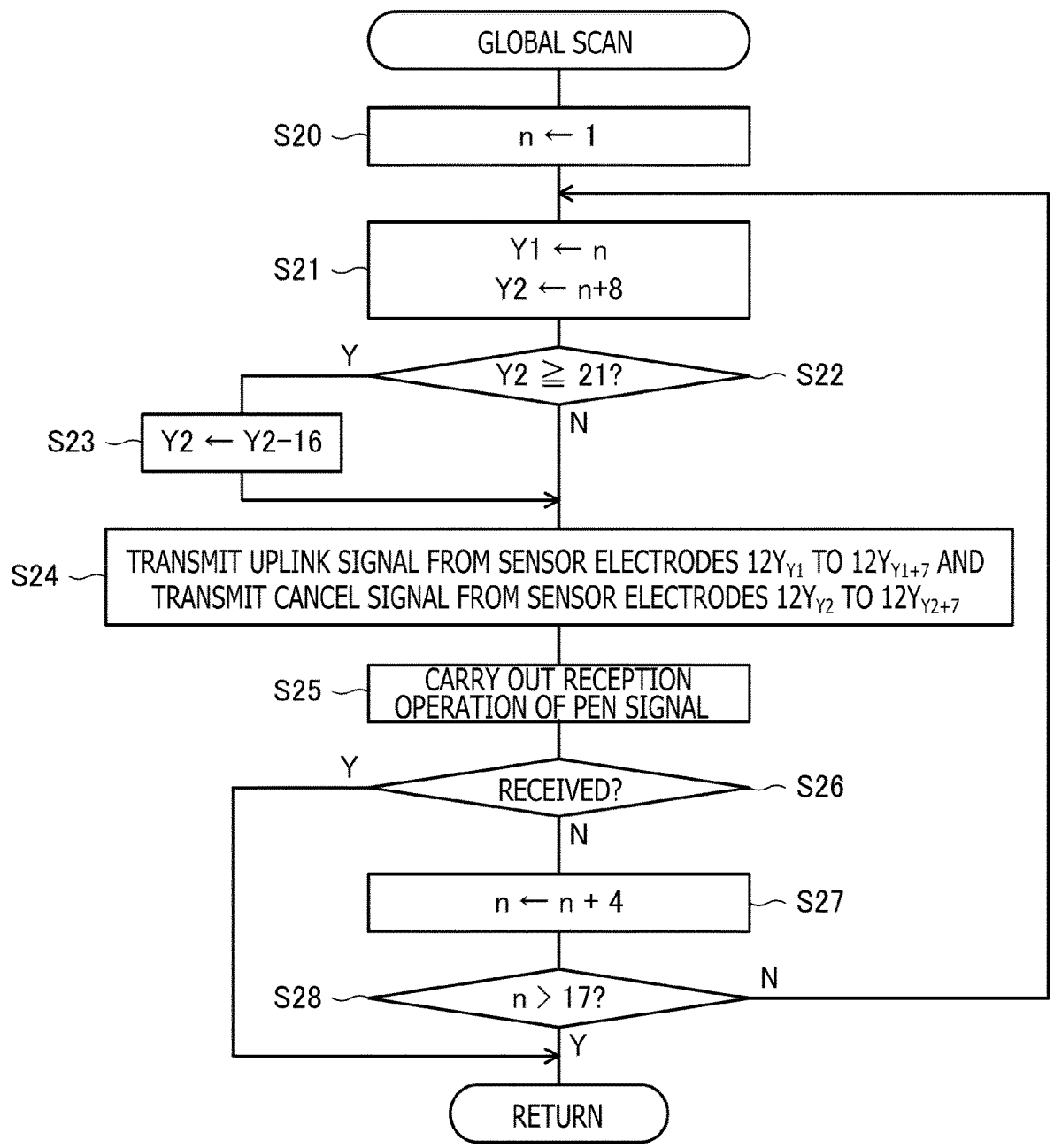
FIG. 9 is a detailed flow diagram of a global scan illustrated in FIG. 8.

FIG. 9 is a detailed flow diagram of the global scan. Note that in the following description, the sensor electrode group 12 includes 24 sensor electrodes 12Y which will be referred to as sensor electrodes 12Yn (n indicates natural numbers 1 to 24). However, it is obvious that the sensor electrode group 12 may include less than 24 or equal to or greater than 25 sensor electrodes 12Y.

In the global scan, the sensor controller 13 selects some of the plurality of sensor electrodes 12Y as AC signal transmission electrodes and selects some other of the plurality of sensor electrodes 12Y as cancellation signal transmission electrodes. The sensor controller 13 is configured to supply the uplink signal US to the AC signal transmission electrodes and to transmit the cancellation signal CA from the cancellation signal transmission electrodes. The sensor controller 13 is also configured to change at least some of one or more sensor electrodes 12Y to be selected as the AC signal transmission electrodes and to change at least some of one or more sensor electrodes 12Y to be selected as the cancellation signal transmission electrodes every time the uplink signal US is transmitted. The details will be described with reference to FIG. 9.

As illustrated in FIG. 9, the sensor controller 13 first assigns 1 to a variable n (step S20) and then assigns n and n+8 to variables Y1 and Y2, respectively (step S21). The sensor controller 13 determines whether or not the variable Y2 is equal to or greater than 21 (step S22). If the sensor controller 13 determines that the variable Y2 is equal to or greater than 21, the sensor controller 13 subtracts 16 from the variable Y2 (step S23).

Subsequently, the sensor controller 13 selects eight sensor electrodes $12Y_{Y1}$ to $12Y_{Y1+7}$ as AC signal transmission electrodes, transmits the uplink signal US from each, selects eight sensor electrodes $12Y_{Y2}$ to $12Y_{Y2+7}$ as cancellation signal transmission electrodes, and transmits the cancellation signal CA from each (step S24). Specifically, as described with reference to FIG. 3, step S24 is executed by supplying the uplink signal US to each of the sensor electrodes $12Y_{Y1}$ to $12Y_{Y1+7}$ and supplying the cancellation signal CA to each of the sensor electrodes $12Y_{Y2}$ to $12Y_{Y2+7}$ under the control of the logic unit 51.

Note that the sensor controller 13 in this case does not supply a signal to each sensor electrode 12X. This is to prevent the uplink signal US (or the cancellation signal CA) transmitted from the sensor electrode 12Y and the cancellation signal CA (or the uplink signal US) transmitted from the sensor electrode 12X from cancelling each other.

In addition, the contents of the uplink signal US transmitted by the sensor controller 13 in step S24 is arbitrary.

For example, a signal with one block including fifteen chips may be transmitted, or two signals with one block may be transmitted.

Therefore, "every time the uplink signal US is transmitted" of "at least some of one or more sensor electrodes 12Y to be selected as AC signal transmission electrodes and at least some of one or more sensor electrodes 12Y to be selected as cancellation signal transmission electrodes are changed every time the uplink signal US is transmitted" in the present embodiment merely (generally) means every time any signal that can be recognized as the uplink signal US is transmitted, and it is not intended to limit the contents of the uplink signal US.

The sensor controller 13 that has finished transmitting the uplink signal US and the cancellation signal CA carries out a reception operation of the pen signal DS (step S25). The reception operation will be described in detail with reference to FIG. 3. The logic unit 51 controls the switches 68$x$ and 68$y$ to connect the R terminals to the common terminals and uses the control signals selX and selY to control the conductor selection circuits 69$x$ and 69$y$ to sequentially select one of the plurality of sensor electrodes 12X and one of the plurality of sensor electrodes 12Y. As a result, the plurality of sensor electrodes 12X and 12Y are sequentially connected one-by-one to the input end of the reception unit 54, and the reception strengths of the pen signals DS in the sensor electrodes 12X and 12Y are sequentially supplied from the reception unit 54 to the MCU 50.

The sensor controller 13 that has executed step S25 then determines whether or not the pen signal DS is received as a result of the reception operation (step S26). As a result, if the sensor controller 13 determines that the pen signal DS is received, the sensor controller 13 ends the process of the global scan and returns to the process of FIG. 8. On the other hand, if the sensor controller 13 determines that the pen signal DS is not received, the sensor controller 13 adds 4 to the variable n (step S27). The sensor controller 13 then determines whether or not the variable n after the addition exceeds 17 (step S28). If the sensor controller 13 determines that the variable n does not exceed 17, the sensor controller 13 returns to step S21 to continue the process. On the other hand, if the sensor controller 13 determines that the variable n exceeds 17, the sensor controller 13 ends the process of the global scan and returns to the process of FIG. 8.

FIGS. 10A to 10E depict a usage manner of the sensor electrodes 12X and 12Y in the global scan illustrated in FIG. 9. The sensor electrodes 12Y illustrated in FIGS. 10A to 10E include sensor electrodes $12Y_1$ to $12Y_{24}$ from the left side of the drawings.

Figure 10A:
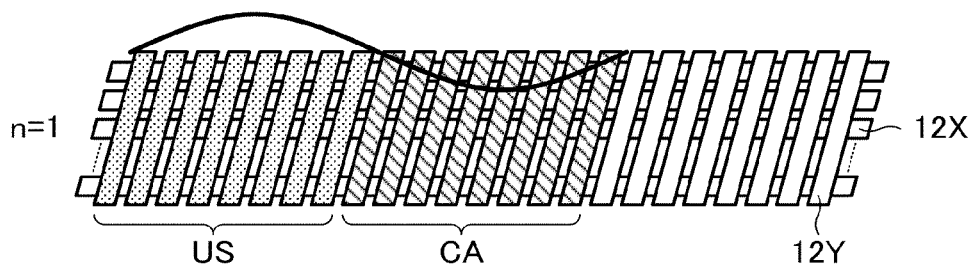
FIGS. 10A to 10E depict a usage manner of the sensor electrode group in the global scan illustrated in FIG. 9.

FIG. 10A illustrates a case in which the variable n is 1. As illustrated in FIG. 10A, the uplink signal US is transmitted from each of the sensor electrodes $12Y_1$ to $12Y_8$, and the cancellation signal CA is transmitted from each of the sensor electrodes $12Y_9$ to $12Y_{16}$ in this case.

Figure 10B:
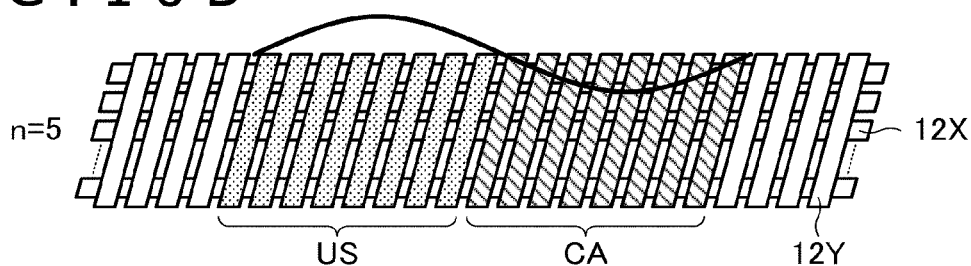

FIG. 10B illustrates a case in which the variable n is 5. As illustrated in FIG. 10B, the uplink signal US is transmitted from each of the sensor electrodes $12Y_5$ to $12Y_{12}$, and the cancellation signal CA is transmitted from each of the sensor electrodes $12Y_{13}$ to $12Y_{20}$ in this case.

Figure 10C:
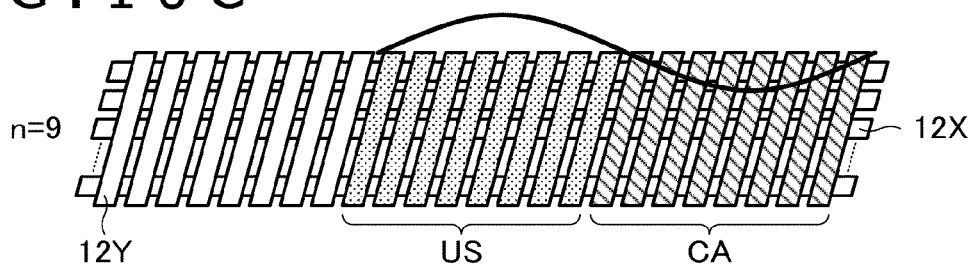

FIG. 10C illustrates a case in which the variable n is 9. As illustrated in FIG. 10C, the uplink signal US is transmitted from each of the sensor electrodes $12Y_9$ to $12Y_{16}$, and the cancellation signal CA is transmitted from each of the sensor electrodes $12Y_{17}$ to $12Y_{24}$ in this case.

Figure 10D:
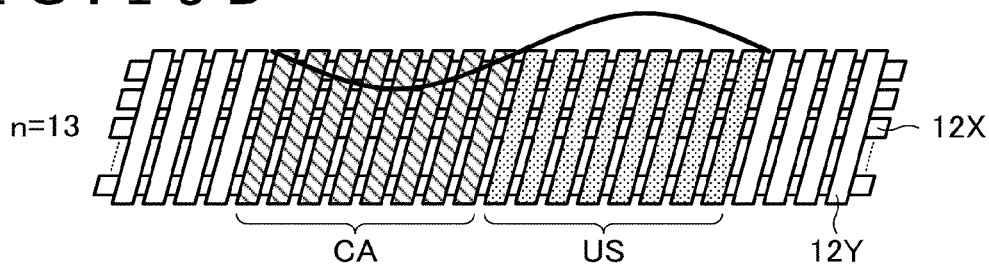

FIG. 10D illustrates a case in which the variable n is 13. As illustrated in FIG. 10D, the uplink signal US is transmitted from each of the sensor electrodes $12Y_{13}$ to $12Y_{20}$, and the cancellation signal CA is transmitted from each of the sensor electrodes $12Y_5$ to $12Y_{12}$ in this case.

Figure 10E:
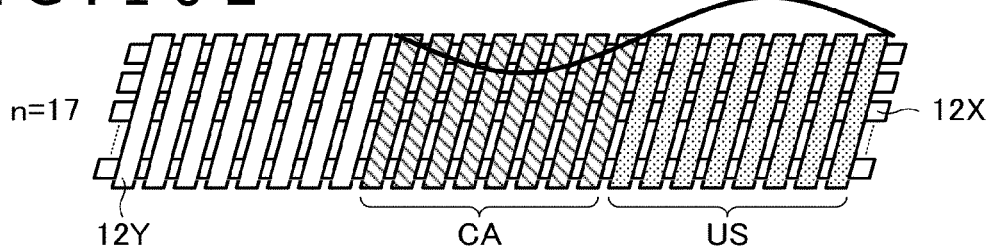

FIG. 10E illustrates a case in which the variable n is 17. As illustrated in FIG. 10E, the uplink signal US is transmitted from each of the sensor electrodes $12Y_{17}$ to $12Y_{24}$, and the cancellation signal CA is transmitted from each of the sensor electrodes $12Y_9$ to $12Y_{16}$ in this case.

In this way, according to the global scan performed by the sensor controller 13 of the present embodiment, the cancellation signal CA is transmitted from the sensor electrode group 12 along with the uplink signal US. Therefore, the uplink signal USa illustrated in FIG. 1 can be replaced by the cancellation signal CA, or the uplink signal USa received by the other hand (for example, the hand grasping the stylus 2) can be a mixed signal of the cancellation signal CA and the uplink signal US. This prevents the situation in which the stylus 2 cannot detect the uplink signal US due to the change in the potential of the ground terminal of the stylus 2 caused by the uplink signal US. In addition, both the uplink signal US and the cancellation signal CA are supplied to the common electrode of the display apparatus 11, and the signals cancel each other. This prevents the uplink signal US from affecting the operation of the display apparatus 11.

According to the global scan performed by the sensor controller 13 of the present embodiment, the uplink signals US are sequentially transmitted from each part of the panel surface 1$a$ instead of the entire panel surface 1$a$. This reduces the possibility that the hand not grasping the stylus 2 receives the uplink signal US. This also prevents the situation in which the stylus 2 cannot detect the uplink signal US due to the change in the potential of the ground terminal of the stylus 2 caused by the uplink signal US.

According to the global scan performed by the sensor controller 13 of the present embodiment, the boundary between the AC signal transmission electrode and the cancellation signal transmission electrode is not fixed, and this can avoid the formation of a region on the panel surface 1$a$ in which the stylus 2 cannot receive the uplink signal US.

Returning to FIG. 8, the sensor controller 13 that has finished the global scan determines whether or not the pen signal DS is received in the reception operation (step S25) carried out in the global scan (step S11). As a result, if the sensor controller 13 determines that the pen signal DS is not received, the sensor controller 13 ends the process of the pen scan and returns to the process of FIG. 7.

If the sensor controller 13 determines that the pen signal DS is received in step S11, the sensor controller 13 carries out a sector scan near the position of the reception of the pen signal DS (step S12). The sector scan is a process for specifying the position of the pen signal DS through calculation, and the sector scan is executed while the stylus 2 continues to transmit the burst signal in response to the uplink signal US.

Figure 11:
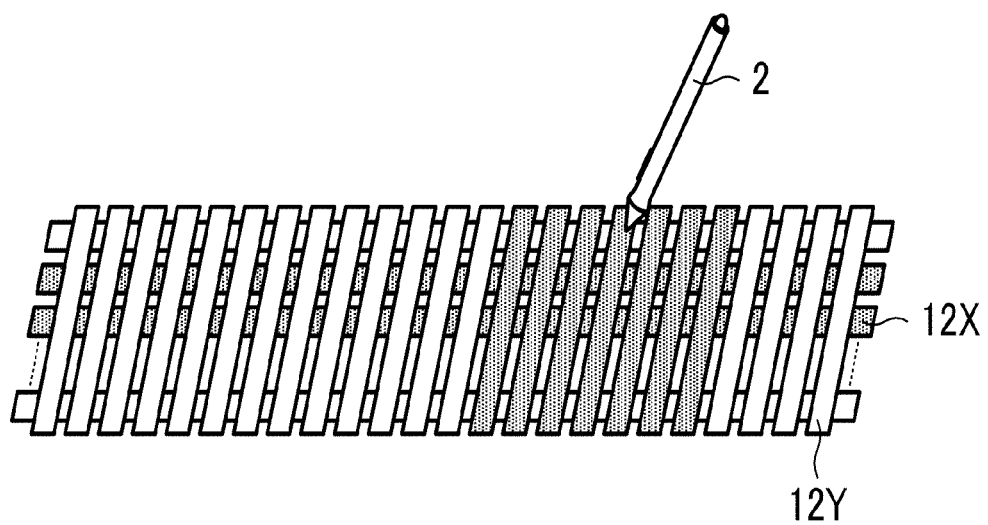
FIG. 11 depicts a usage manner of the sensor electrode group in a sector scan illustrated in FIG. 8.

FIG. 11 depicts a usage manner of the sensor electrodes 12X and 12Y in the sector scan. Hereinafter, a reception operation performed by the sensor controller 13 in the sector scan will be described in detail with reference to FIG. 11 and FIG. 3.

The MCU 50 first selects one of the plurality of sensor electrodes 12X and one of the plurality of sensor electrodes 12Y close to the stylus 2 based on the result of the global scan. The selection is based on the reception strength of the pen signal DS in each of the sensor electrodes 12X and 12Y supplied from the reception unit 54 to the MCU 50. The logic unit 51 then sequentially selects predetermined numbers of sensor electrodes 12X and 12Y (sensor electrodes 12X and 12Y hatched in FIG. 11) from the ones closer to the sensor electrodes 12X and 12Y selected by the MCU 50. Subsequently, the logic unit 51 controls the switches 68x and 68y to connect the R terminals to the common terminals and then uses the control signals selX and selY to control the conductor selection circuits 69x and 69y to sequentially select the selected predetermined numbers of sensor electrodes 12X and 12Y. As a result, the selected predetermined numbers of sensor electrodes 12X and 12Y are sequentially connected one-by-one to the input end of the reception unit 54, and the reception strengths of the pen signals DS in the sensor electrodes 12X and 12Y are sequentially supplied from the reception unit 54 to the MCU 50.

Returning to FIG. 8, the sensor controller 13 that has finished the sector scan determines whether or not the pen signal DS is received in the reception operation carried out in the sector scan (step S13). As a result, if the sensor controller 13 determines that the pen signal DS is not received, the sensor controller 13 ends the process of the pen scan and returns to the process of FIG. 7.

If the sensor controller 13 determines that the pen signal DS is received in step S13, the sensor controller 13 detects the position of the stylus 2 (step S14). The MCU 50 illustrated in FIG. 3 executes the detection process through calculation (for example, calculation including linear interpolation) based on the reception strength of the pen signal DS in each of the sensor electrodes 12X and 12Y supplied from the reception unit 54. The position of the stylus 2 is specified by the process of step S14. The specified position is supplied from the sensor controller 13 to the host processor 10 illustrated in FIG. 3.

Figure 12:
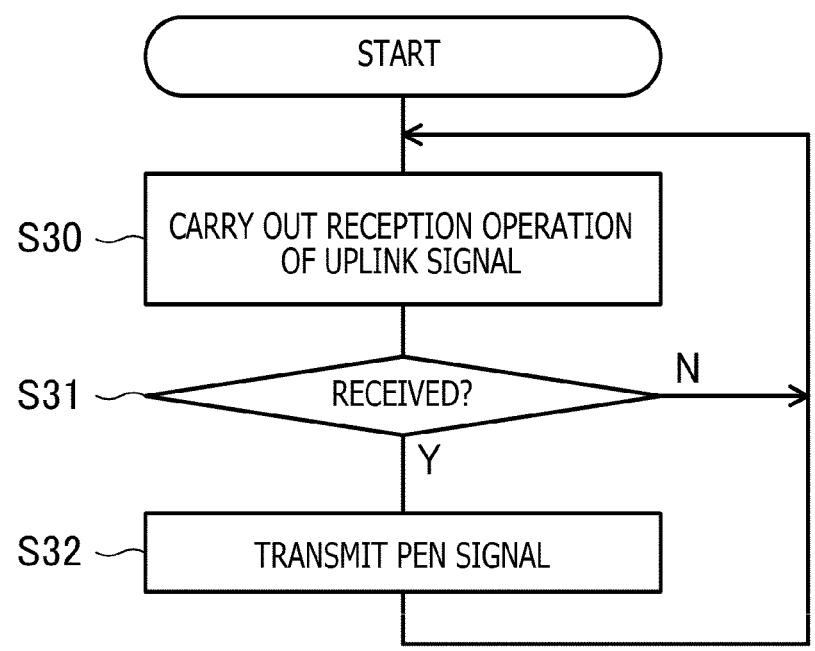
FIG. 12 is a flow diagram of a process executed by the stylus.

FIG. 12 is a flow diagram of a process executed by the stylus 2. As illustrated in FIG. 12, the stylus 2 continuously carries out the reception operation of the uplink signal US until the uplink signal US is received (steps S30 and S31). As described above, the stylus 2, when receiving the cancellation signal CA, can receive the cancellation signal CA as the uplink signal US. Note that the stylus 2 may intermittently perform the reception operation of the uplink signal US to reduce the power consumption. When the uplink signal US is received, the stylus 2 transmits the pen signal DS including the burst signal and the data signal (step S32) and returns to step S30 again to wait for the reception of the uplink signal US.

As described above, the sensor controller 13 according to the present embodiment prevents the uplink signal US from changing the ground potential of the stylus 2, and this prevents the situation in which the stylus 2 cannot detect the uplink signal US due to the change in the ground potential.

In addition, the sensor controller 13 prevents the uplink signal US from appearing in the display electrodes (particularly, the common electrodes) of the display apparatus 11, and this prevents the uplink signal US from affecting the operation of the display apparatus 11.

Note that the usage manner of the sensor electrodes 12Y in the global scan is not limited to that which is described with reference to FIGS. 10A to 10E. For example, the sensor controller 13 may select the sensor electrodes 12Y to be used as AC signal transmission electrodes and the sensor electrodes 12Y to be used as cancellation signal transmission electrodes such that predetermined numbers of AC signal transmission electrodes and cancellation signal transmission electrode are alternately arranged in the Y direction. The sensor controller 13 may also select the sensor electrodes 12Y to be used as AC signal transmission electrodes and the sensor electrodes 12Y to be used as cancellation signal transmission electrodes such that the AC signal transmission electrodes and the cancellation signal transmission electrodes slide while partially overlapping in the Y direction, every time the uplink signal US is transmitted.

Figure 13A:
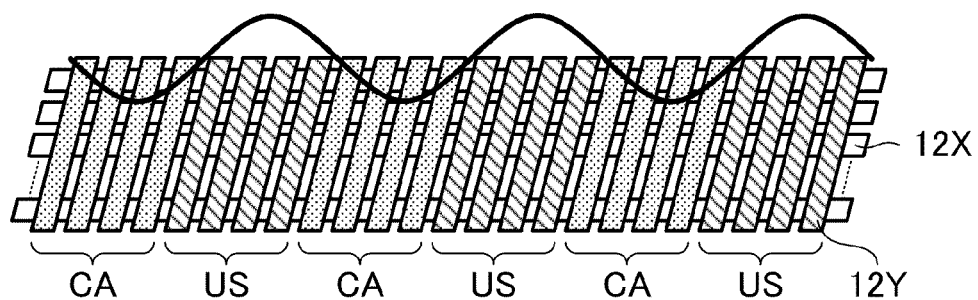
FIGS. 13A to 13C depict a modification to the usage manner of the sensor electrode group in the global scan.
Figure 13B:
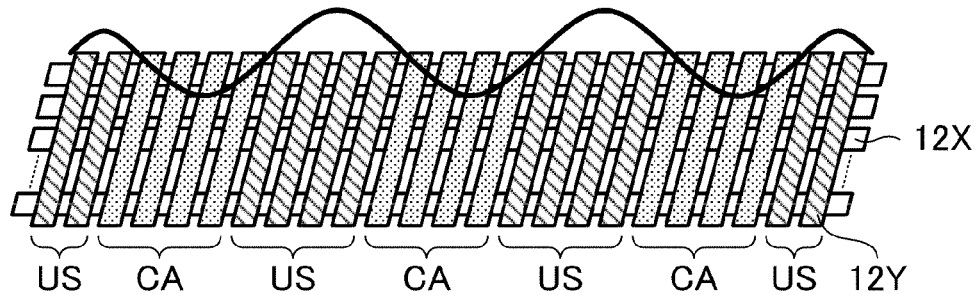
Figure 13C:
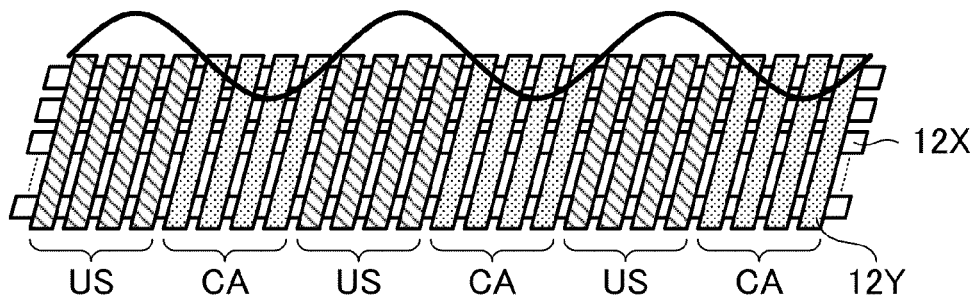

FIGS. 13A to 13C depict a modification to the usage manner of the sensor electrodes 12Y in the global scan. In the modification, the uplink signal US is first transmitted from each of the sensor electrodes $12Y_5$ to $12_8$, $12Y_{13}$ to $12Y_{16}$, and $12Y_{21}$ to $12Y_{24}$, and the cancellation signal CA is transmitted from each of the sensor electrodes $12Y_1$ to $12Y_4$, $12Y_9$ to $12Y_{12}$, and $12Y_{17}$, to $12Y_{20}$ as illustrated in FIG. 13A. Next, the uplink signal US is transmitted from each of the sensor electrodes $12Y_1$ and $12Y_2$, $12Y_7$ to $12Y_{10}$, $12Y_{15}$ to $12Y_{18}$, and $12Y_{23}$ and $12Y_{24}$, and the cancellation signal CA is transmitted from each of the sensor electrodes $12Y_3$ to $12Y_6$, $12Y_{11}$ to $12Y_{14}$, and $12_{19}$ to $12Y_{22}$ as illustrated in FIG. 13B. Lastly, the uplink signal US is transmitted from each of the sensor electrodes $12Y_1$ to $12Y_4$, $12Y9$ to $12Y_{12}$, and $12Y_{17}$ to $12Y_{20}$, and the cancellation signal CA is transmitted from each of the sensor electrodes $12Y_5$ to $12Y_8$, $12Y_{13}$ to $12Y_{16}$, and $12Y_{21}$ to $12Y_{24}$ as illustrated in FIG. 13C.

In the example, the predetermined numbers of AC signal transmission electrodes and cancellation signal transmission electrodes are alternately arranged in the Y direction, and the AC signal transmission electrodes and the cancellation signal transmission electrodes slide while partially overlapping in the Y direction, every time the uplink signal US is transmitted. Therefore, advantageous effects similar to the advantageous effects of the present embodiment can be obtained, and in addition, since one of the uplink signal US and the cancellation signal CA is always transmitted from the entire panel surface 1a, the possibility of the stylus 2 failing to receive the uplink signal US can be reduced. Furthermore, the boundary between the AC signal transmission electrode and the cancellation signal transmission electrode is not fixed, and this can avoid the formation of a region on the panel surface 1a in which the stylus 2 cannot receive the uplink signal US.

Figure 14A:
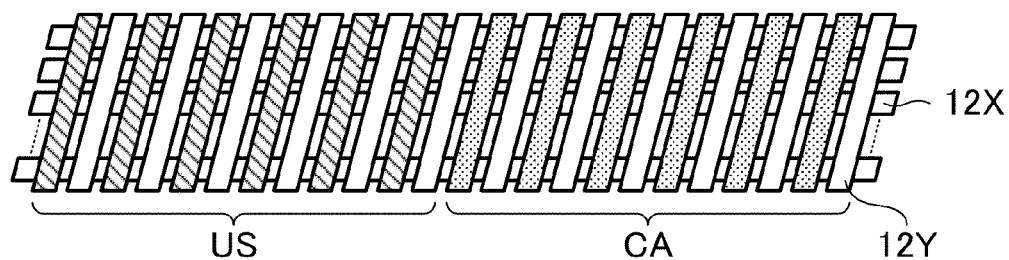
FIGS. 14A to 14D depict another modification to the usage manner of the sensor electrodes in the global scan.
Figure 14B:
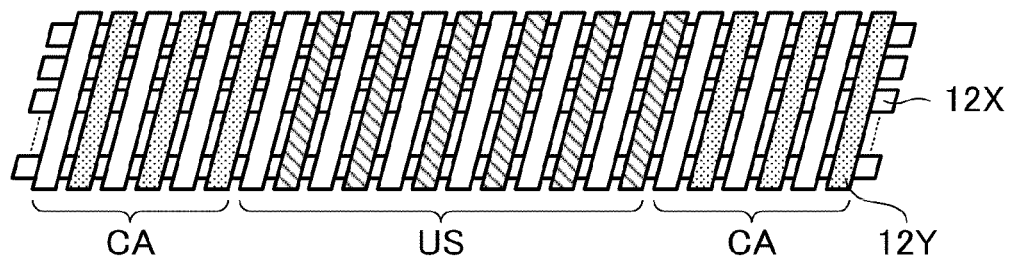
Figure 14C:
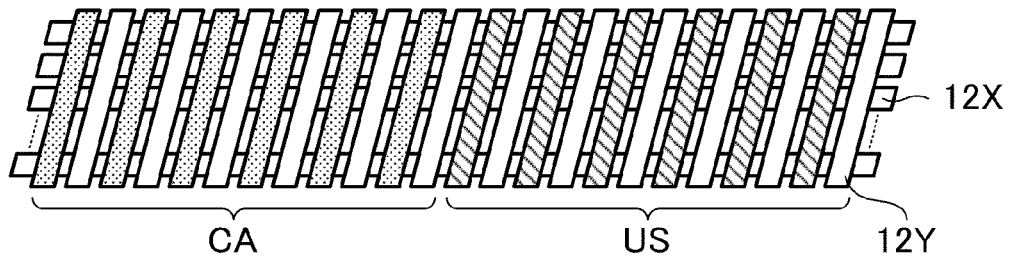
Figure 14D:
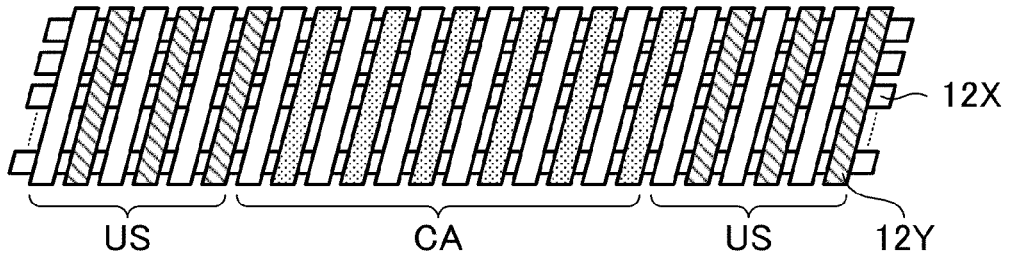
Figure 15A:
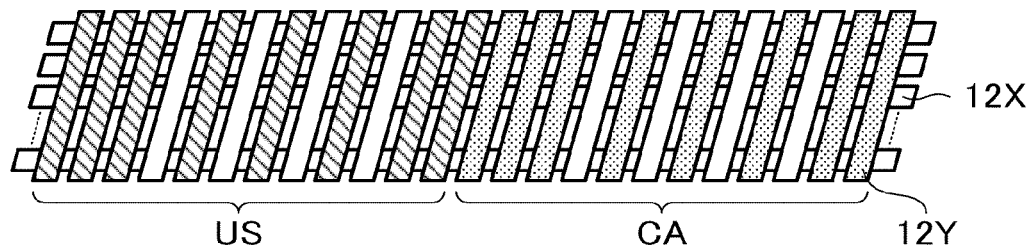
FIGS. 15A to 15D depict yet another modification to the usage manner of the sensor electrodes in the global scan.
Figure 15B:
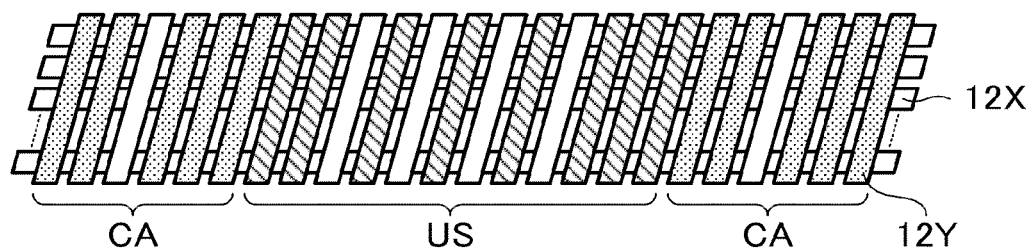
Figure 15C:
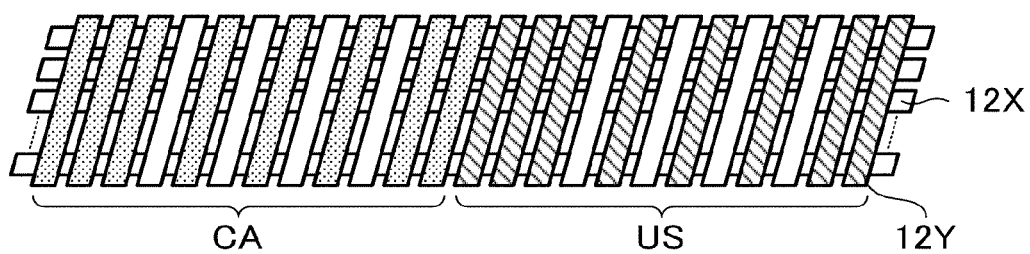
Figure 15D:
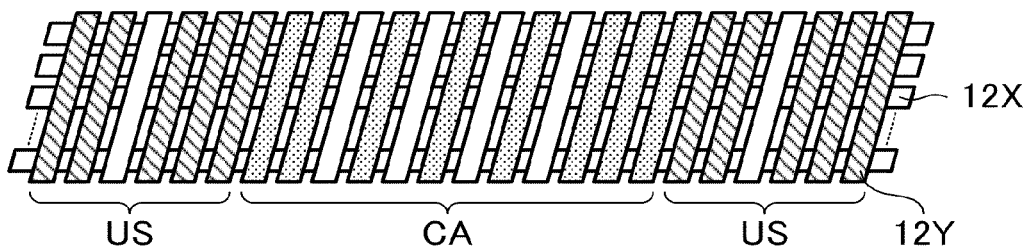

FIGS. 14A to 14D depict another modification to the usage manner of the sensor electrodes 12Y in the global scan. In the modification, first, each of the sensor electrodes $12Y_1$ to $12Y_{12}$ is used for transmitting the uplink signal US, and each of the sensor electrodes $12Y_{13}$ to $12Y_{24}$ is used for transmitting the cancellation signal CA as illustrated in FIG. 14A. Next, each of the sensor electrodes $12Y_7$ to $12Y_{18}$ is used for transmitting the uplink signal US, and each of the sensor electrodes $12Y_1$ to $12Y_6$ and $12Y_{19}$ to $12Y_{24}$ is used for transmitting the cancellation signal CA as illustrated in FIG. 14B. Next, each of the sensor electrodes $12Y_{13}$ to $12Y_{24}$ is used for transmitting the uplink signal US, and each of the sensor electrodes $12Y_1$ to $12Y_{12}$ is used for transmitting the cancellation signal CA as illustrated in FIG. 14C. Lastly, each of the sensor electrodes $12Y_1$ to $12Y_6$ and $12Y_{19}$ to $12Y_{24}$ is used for transmitting the uplink signal US, and each of the sensor electrodes $12Y_7$ to $12Y_{18}$ is used for transmitting the cancellation signal CA as illustrated in FIG. 14D.

However, in the cases of FIGS. 14A and 14C, only twelve sensor electrodes $12Y_{2k-1}$ (k indicates integers 1 to 12) actually transmit the signals, and the other twelve sensor electrodes $12Y_{2k}$ do not transmit signals. In the cases of FIGS. 14B and 14D, only twelve sensor electrodes $12Y_{2k}$ actually transmit the signals, and the other twelve sensor electrodes $12Y_{2k-1}$ do not transmit signals. Therefore, the present modification removes every other sensor electrodes 12Y used for transmitting signals.

The modification illustrated in FIGS. 14A to 14D is similar to the modification illustrated in FIGS. 13A to 13C in that the predetermined numbers of AC signal transmission electrodes and cancellation signal transmission electrodes are alternately arranged in the Y direction, and the AC signal transmission electrodes and the cancellation signal transmission electrodes slide while partially overlapping in the Y direction, every time the uplink signal US is transmitted. However, the modification illustrated in FIGS. 14A to 14D is different from the modification illustrated in FIGS. 13A to 13C in that the modification removes every other sensor electrodes that actually transmit signals, and the number of transmission electrodes is reduced to half. In this way, while the advantageous effects similar to the advantageous effects of the modification illustrated in FIGS. 13A to 13C are obtained, the power necessary for signal transmission can be reduced compared to the modification illustrated in FIGS. 13A to 13C.

FIGS. 15A to 15D depict yet another modification to the usage manner of the sensor electrodes 12Y in the global scan. In the modification, some of the sensor electrodes 12Y that do not transmit signals in the modification illustrated in FIGS. 14A to 14D transmit signals. Specifically, the sensor electrodes 12Y close to the end portion of the panel surface 1a and the sensor electrodes 12Y close to the boundary between the AC signal transmission electrode and the cancellation signal transmission electrode transmit signals.

When both of the uplink signal US and the cancellation signal CA are transmitted from one panel surface 1a at the same time, the signal strength tends to be weak at the end portion of the panel surface 1a and at the boundary between the AC signal transmission electrode and the cancellation signal transmission electrode. The modification illustrated in FIGS. 15A to 15D can increase the signal strength at the parts where the signal strength tends to be weak.

Although the sensor electrode group 12 is a mutual-capacitance type (that is, the stylus 2 and the finger are detected based on the change in the capacitance between the sensor electrodes 12X and 12Y) in the example described in the present embodiment, the present invention can also be applied when the sensor electrode group 12 is a self-capacitance type.

Figure 16A:
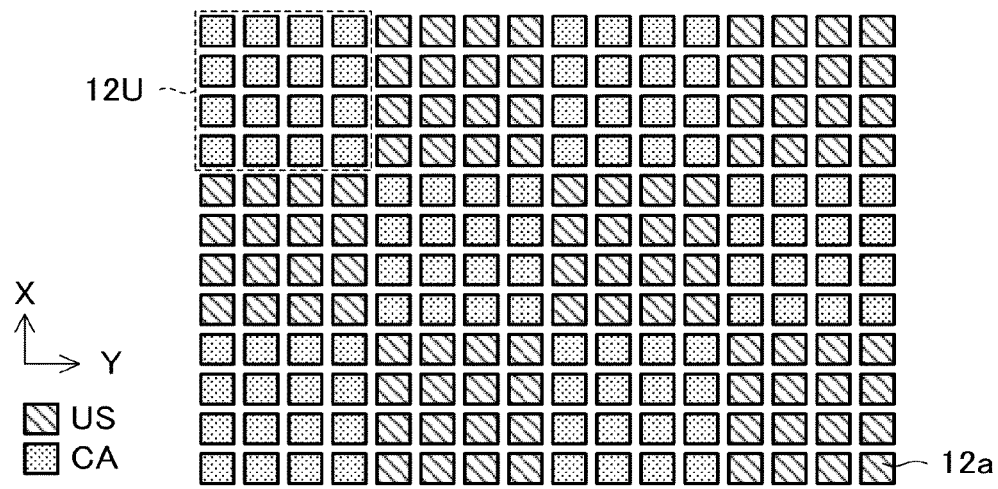
FIGS. 16A to 16C depict a usage manner of the sensor electrode group in the global scan executed when the sensor electrode group is a self-capacitance type.
Figure 16B:
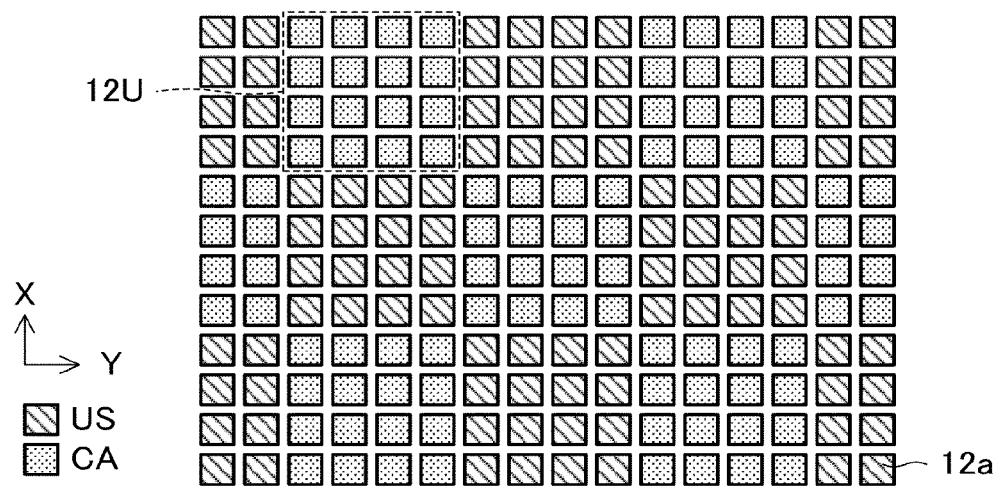
Figure 16C:
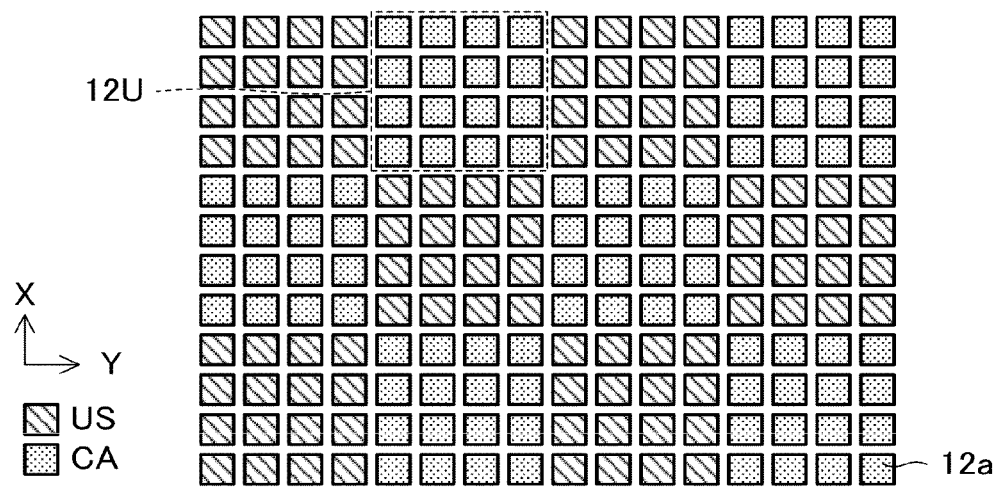

FIGS. 16A to 16C depict a usage manner of sensor electrodes 12a in the global scan executed when the sensor electrode group 12 is the self-capacitance type. The sensor electrode group 12 in this case includes a plurality of sensor electrodes 12a that are square electrodes arranged in a matrix as illustrated in FIGS. 16A to 16C.

The sensor controller 13 in the example of FIGS. 16A to 16C regards 4×4 sensor electrodes 12a as one sensor electrode unit 12U and transmits the uplink signal US and the cancellation signal CA. Specifically, the sensor controller 13 controls the signal transmitted from each of the sensor electrodes 12a such that the transmitted signals vary between adjacent sensor electrode units 12U as illustrated in FIGS. 16A to 16C.

In addition, the sensor controller 13 controls the signal transmitted from each of the sensor electrodes 12a such that the sensor electrode units 12U slide while partially overlapping in the Y direction. For example, focusing on the sensor electrode unit 12U on the upper left in FIG. 16A, the sensor controller 13 controls the signal transmitted from each of the sensor electrodes 12a such that the sensor electrode unit 12U is shifted by two sensor electrodes 12a in the Y direction every time the uplink signal US is transmitted.

According to the example of FIGS. 16A to 16C, the advantageous effects similar to the advantageous effects of the present embodiment can be obtained. In addition, as in the example of FIGS. 13A to 13C, one of the uplink signal US and the cancellation signal CA is always transmitted from the entire panel surface 1a, and this can reduce the possibility of the stylus 2 failing to receive the uplink signal US. Furthermore, the boundary between the AC signal transmission electrode and the cancellation signal transmission electrode is not fixed, and this can avoid the formation of a region on the panel surface 1a in which the stylus 2 cannot receive the uplink signal US.

In addition, according to the present embodiment, the feature that both of the uplink signal US and the cancellation signal CA are transmitted at the same time may be taken advantage of to reduce the current consumption in signal transmission.

FIG. 17 is a diagram describing a specific method for reducing the current consumption in signal transmission. In a case where the uplink signal US is a signal in which the potential level is switched between high and low as illustrated in FIG. 17, the potential of the AC signal transmission electrode needs to be changed from high to low or from low to high to change the potential level of the uplink signal US. The same applies to the cancellation signal transmission electrode. To change the potential level of each electrode between high and low in this way, a current with a relatively large value needs to be supplied to each electrode, and this increases the current consumption in signal transmission.

In a case considered here, the cancellation signal CA is a reverse phase signal of the uplink signal US. For example, to change the potential of the AC signal transmission electrode from high to low (time t1 illustrated in FIG. 17), the potential of the cancellation signal transmission electrode needs to be changed from low to high. For example, to change the potential of the AC signal transmission electrode from low to high (time t2 illustrated in FIG. 17), the potential of the cancellation signal transmission electrode needs to be changed from high to low. This can be used to halve the amount of current that needs to be supplied to change the potential.

More specifically, the sensor controller 13 can switch an illustrated control signal Ctrl (details will be described later with reference to FIG. 18) to high for an arbitrary period at the timing (time t1, t2) of changing the potential of each electrode to thereby short-circuit the AC signal transmission electrode and the cancellation signal transmission electrode. FIG. 17 illustrates changes in the potential (drive waveforms) of the short-circuited AC signal transmission electrode and cancellation signal transmission electrode. As indicated by the drive waveforms, each electrode is pre-charged at an intermediate potential of high and low as a result of the short-circuit. Therefore, the amount of current necessary to subsequently change the potential of each electrode to one of high and low is half the case in which the potential is directly shifted between high and low. Therefore, according to the present embodiment, the current consumption in signal transmission can be reduced.

Figure 18:
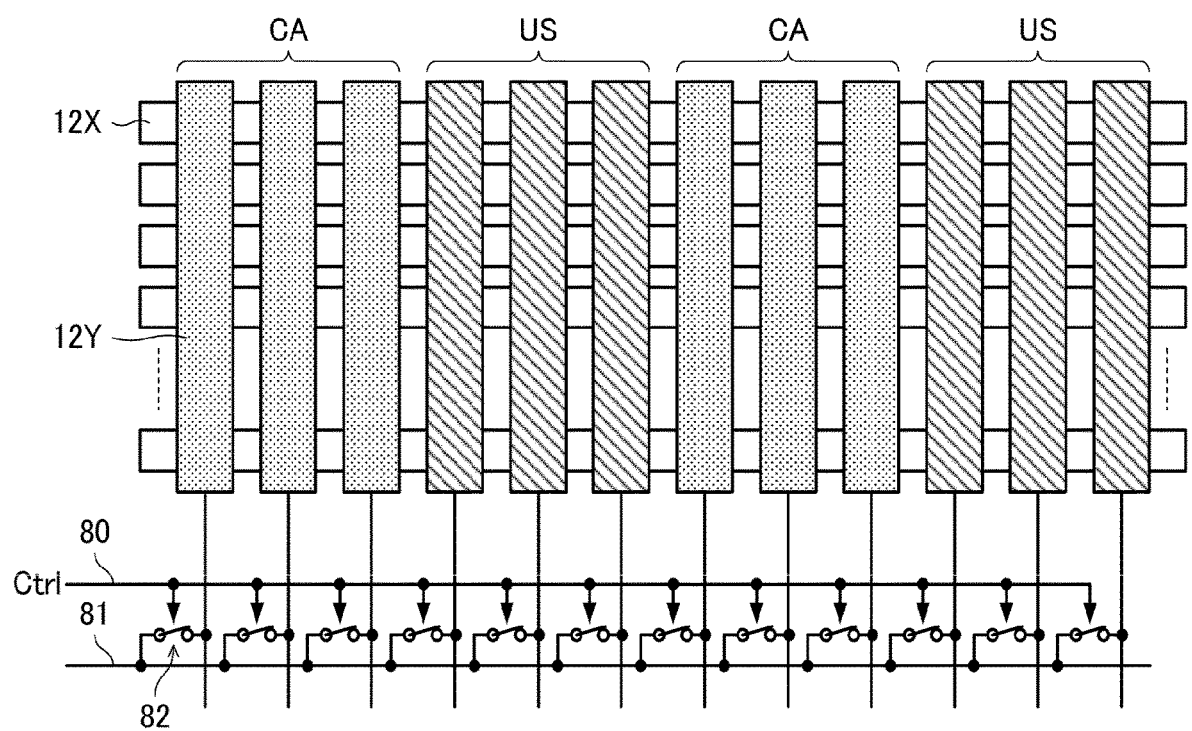
FIG. 18 depicts an example of a circuit configuration for realizing a pre-charge operation.

FIG. 18 depicts an example of a circuit configuration for realizing the pre-charge operation. As illustrated in FIG. 18, the tablet terminal 1 in the example includes a pre-charge control line 80, a short circuit 81, and a plurality of switches 82. The switch 82 is provided for each sensor electrode 12Y. One end of the switch 82 is connected to the corresponding sensor electrode 12Y, and the other end is connected to the short circuit 81. The control signal Ctrl is supplied to the pre-charge control line 80.

Each switch 82 is in an ON state when the control signal Ctrl is high and is in an OFF state when the control signal Ctrl is low. Therefore, when the sensor controller 13 switches the control signal Ctrl to high at the timing of changing the potential in each electrode as illustrated in FIG. 17, each switch 82 enters the ON state, and each sensor electrode 12Y is short-circuited through the short circuit 81. As a result, each electrode is pre-charged to the intermediate potential of high and low as described above. In this way, the configuration of FIG. 18 can pre-charge each electrode to the intermediate potential of high and low at the timing of changing the potential in each electrode.

Note that FIG. 18 is one example of the circuit configuration for realizing the pre-charge operation, and other configurations can also be adopted. For example, the pre-charge control line 80 may be provided for each switch 82 to perform different ON-OFF control in each switch 82. In addition, the short circuit 81 need not be provided, and adjacent sensor electrodes 12Y may be directly connected through a switch.

Next, a second embodiment of the present invention will be described. The present embodiment is different from the first embodiment in that when the position of the palm is detected in the touch scan executed prior to the execution of the global scan, one or more sensor electrodes 12Y to be selected as cancellation signal transmission electrodes are determined based on the detected position of the palm. The other points including the internal configurations of the sensor electrode group 12 and the sensor controller 13 illustrated in FIG. 3 and the internal configuration of the stylus 2 illustrated in FIG. 6 are similar to the internal configurations of the first embodiment, and the following description focuses on the differences from the first embodiment.

Figure 19:
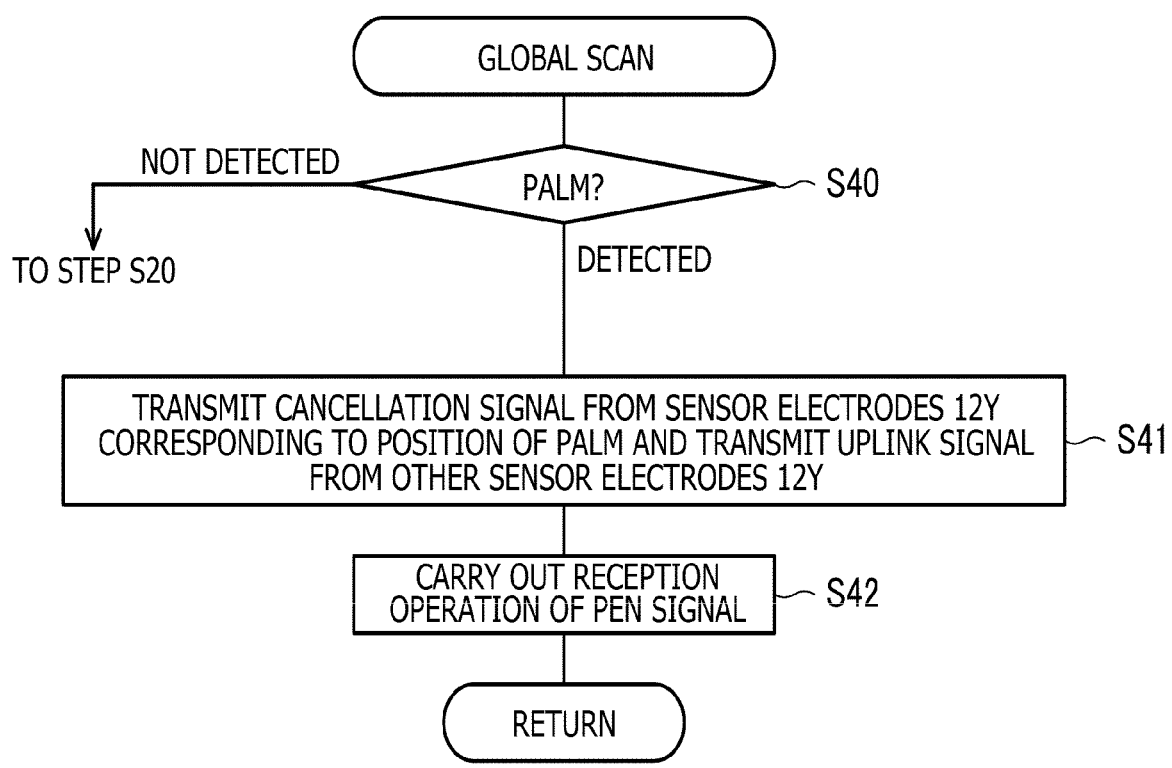
FIG. 19 is a detailed flow diagram of the global scan according to a second embodiment of the present invention.

FIG. 19 is a detailed flow diagram of the global scan according to the second embodiment of the present invention. As illustrated in FIG. 19, the sensor controller 13 according to the present embodiment starts the global scan and first determines whether or not the palm is detected (step S40). As a result, if the sensor controller 13 determines that the palm is not detected, the sensor controller 13 moves the process to step S20 illustrated in FIG. 9 and executes the global scan as described in the first embodiment.

On the other hand, the sensor controller 13 that has determined that the palm is detected in step S40 selects one or more sensor electrodes 12Y to be used as cancellation signal transmission electrodes based on the palm position obtained in step S2 of FIG. 7.

The sensor controller 13 then transmits the cancellation signal CA from the selected sensor electrodes 12Y and transmits the uplink signal US from the other sensor electrodes 12Y (step S41). The sensor controller 13 then carries out the reception operation of the pen signal DS as in step S25 illustrated in FIG. 8 (step S42).

According to the present embodiment, the possibility of replacing the uplink signal USa illustrated in FIG. 1 by the cancellation signal CA is higher than in the first embodiment. This can more surely prevent the situation in which the stylus 2 cannot detect the uplink signal US due to the change in the potential of the ground terminal of the stylus 2 caused by the uplink signal US.

Note that the present embodiment can also be applied to the self-capacitance sensor electrode group 12 illustrated in FIG. 16. This will now be described.

Figure 20:
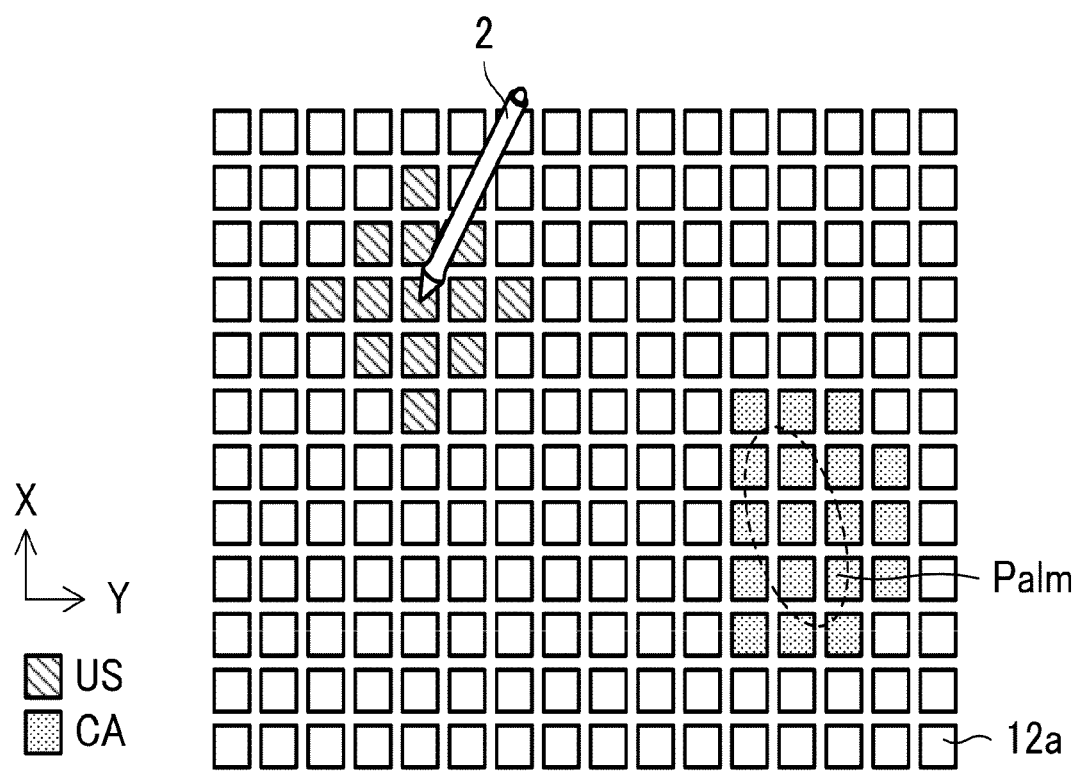
FIG. 20 depicts an example of applying the second embodiment of the present invention to the self-capacitance sensor electrode group.

FIG. 20 depicts an example of the case in which the present embodiment is applied to the self-capacitance sensor electrode group 12. When the position of the palm is detected in the touch scan in the example, one or more sensor electrodes 12a to be selected as the cancellation signal transmission electrodes are determined based on the detected position of the palm. Specifically, only one or more sensor electrodes 12a near the palm position are selected as the cancellation signal transmission electrodes. In this way, the possibility of replacing the uplink signal USa illustrated in FIG. 1 with the cancellation signal CA is higher than in the first embodiment also when the self-capacitance sensor electrode group 12 is used. This can more surely prevent the situation in which the stylus 2 cannot detect the uplink signal US due to the change in the potential of the ground terminal of the stylus 2 caused by the uplink signal US.

In the example of FIG. 20, the one or more sensor electrodes 12a to be selected as the AC signal transmission electrodes are also limited as in the case of the cancellation signal transmission electrodes. However, the limitation is based on the position of the stylus 2 detected in the sector scan of the last time (see step S14 of FIG. 8) instead of the position of the palm. In this way, the operation of driving the sensor electrodes 12a for transmitting signals can be eliminated in the sensor electrodes 12a in which neither the uplink signal US nor the cancellation signal CA is transmitted. This can obtain advantageous effects of reducing the power consumption, reducing the noise, and improving the reliability.

Next, a third embodiment of the present invention will be described. The present embodiment is different from the first embodiment in that electrodes different from the plurality of sensor electrodes 12X and 12Y of the sensor electrode group 12 are used as cancellation signal transmission electrodes. The other points including the internal configuration of the stylus 2 illustrated in FIG. 6 are similar to those of the first embodiment, and the following description focuses on the differences from the first embodiment.

Figure 21:
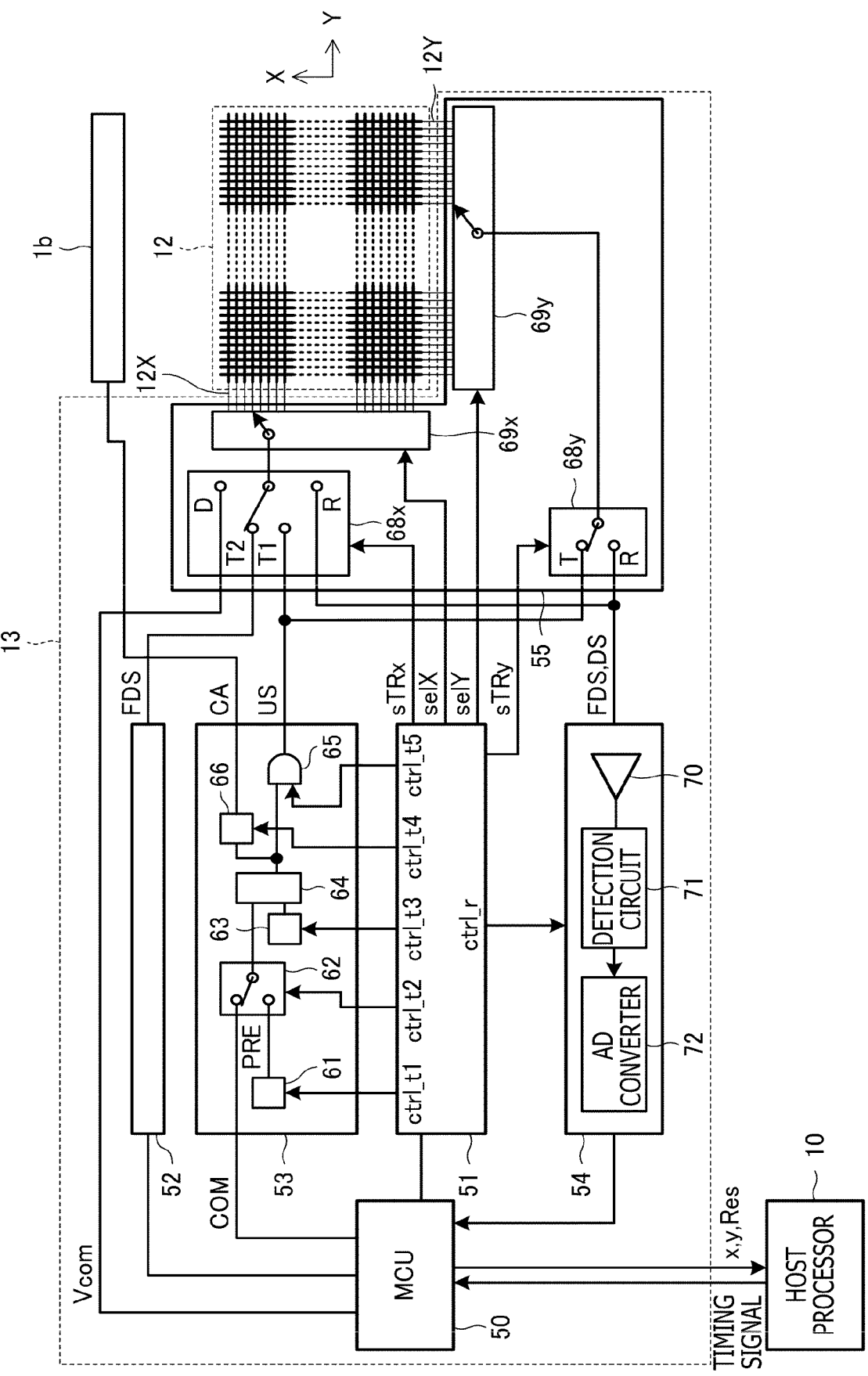
FIG. 21 depicts internal configurations of the sensor electrode group and the sensor controller according to a third embodiment of the present invention.

FIG. 21 depicts internal configurations of the sensor electrode group 12 and the sensor controller 13 according to the present embodiment. A cancellation signal transmission electrode 1b illustrated in FIG. 21 is an electrode provided on a position expected to be touched by the user operating the stylus 2. For example, the cancellation signal transmission electrode 1b is provided on all or part (for example, part touched by the hand not holding the stylus 2 in operating the stylus 2 while holding the tablet terminal 1) of the back surface (opposite side of the panel surface 1a) of the tablet terminal 1.

In the present embodiment, the output end of the cancellation signal generation unit 66 is connected to the cancellation signal transmission electrode 1b. In this way, the sensor controller 13 according to the present embodiment is configured to transmit the cancellation signal CA from the cancellation signal transmission electrode 1b. The timing of transmitting the cancellation signal CA may be similar to the timing in the first embodiment.

According to the present embodiment, the cancellation signal CA can also be provided to the human body 3 (see FIG. 2) of the user. This can prevent the situation in which the stylus 2 cannot detect the uplink signal US due to the change in the potential of the ground terminal of the stylus 2 caused by the uplink signal US as in the first embodiment. Note than even if the hand of the user is in contact with the panel surface 1a, and the uplink signal US is supplied from the panel surface 1a to the human body 3, the cancellation signal CA is supplied from another part of the human body 3 into the human body 3 according to the present embodiment. Therefore, the uplink signal US and the cancellation signal CA cancel each other in the human body 3, and this prevents the uplink signal US from being supplied to the ground terminal of the stylus 2.

Next, a fourth embodiment of the present invention will be described. Although the present embodiment is similar to the third embodiment in that electrodes different from the plurality of sensor electrodes 12X and 12Y in the sensor electrode group 12 are used as cancellation signal transmission electrodes, the present embodiment is different from the third embodiment in that the display electrodes are used as the electrodes. The other points are similar to those of the third embodiment, and the following description focuses on the differences from the third embodiment.

Figure 22:
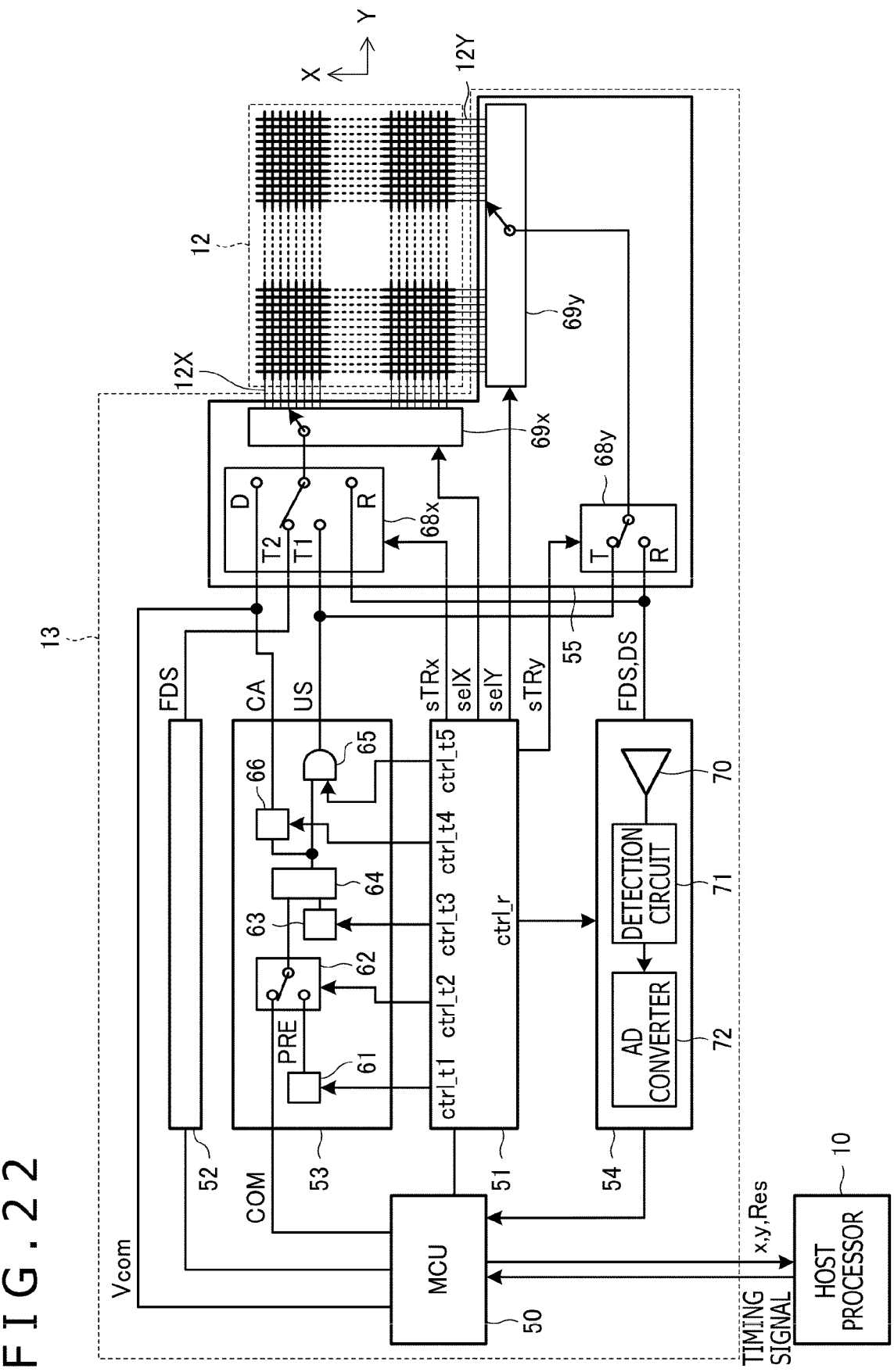
FIG. 22 depicts internal configurations of the sensor electrode group and the sensor controller according to a fourth embodiment of the present invention.

FIG. 22 depicts internal configurations of the sensor electrode group 12 and the sensor controller 13 according to the present embodiment. As illustrated in FIG. 22, the output end of the cancellation signal generation unit 66 is connected to the D terminal of the switch 68x in the present embodiment.

The sensor controller 13 according to the present embodiment uses the control signal sTRx to control the switch 68x such that the common terminal is connected to the D terminal at the timing of the transmission of the uplink signal US. At the same time, the sensor controller 13 uses the control signal selX to control the conductor selection circuit 69x such that all or part of the plurality of sensor electrodes 12X are connected at the same time to the common terminal of the switch 68x. As a result, the uplink signal US and the cancellation signal CA are cancelled in the sensor electrodes 12X as common electrodes. Therefore, the present embodiment prevents the uplink signal US from affecting the operation of the display apparatus 11 as in the first embodiment.

Note that the display apparatus 11 does not perform the drive operation of the pixels during the transmission of the uplink signal US, and the common potential Vcom from the MCU 50 and the cancellation signal CA from the cancellation signal generation unit 66 are not supplied to the sensor electrodes 12X at the same time. According to the present embodiment, although the uplink signals US are not easily output from the panel surface 1a, some uplink signals US are output, and the sensor controller 13 can detect the stylus 2. The present embodiment is particularly effective in reducing the influence on the operation of the display apparatus 11.

Figure 23:
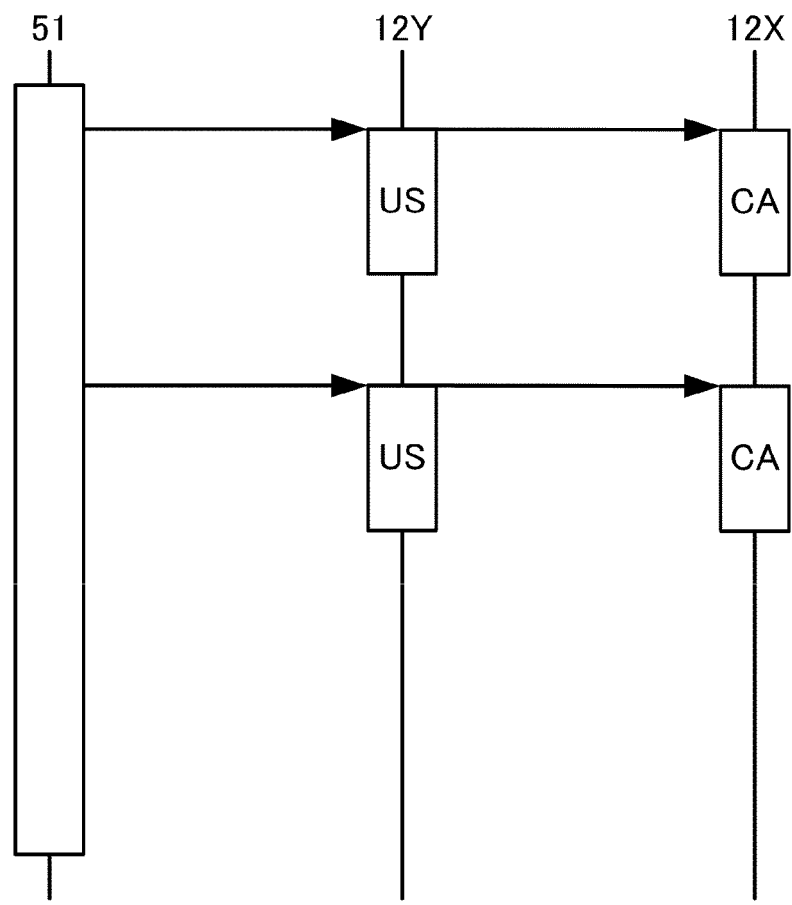
FIG. 23 is a sequence diagram illustrating a process of a logic unit illustrated in FIG. 22.

FIG. 23 is a sequence diagram illustrating a process of the logic unit 51 according to the present embodiment. As illustrated in FIG. 23, the logic unit 51 according to the preset embodiment is configured to supply the uplink signal US to each sensor electrode 12Y and to supply the cancellation signal CA to each sensor electrode 12X at the same time. As a result, the uplink signal US and the cancellation signal CA can be cancelled in the sensor electrodes 12X as common electrodes as described above.

Note that although the tablet terminal 1 is the in-cell type in the example illustrated in FIG. 22, the present embodiment can also be applied to an on-cell or out-cell tablet terminal. In this case, the output end of the cancellation signal generation unit 66 is connected to the common electrodes provided in the display apparatus 11. The sensor controller 13 then causes the cancellation signal generation unit 66 to output the cancellation signal CA at the timing of the transmission of the uplink signal US. As a result, the uplink signal US and the cancellation signal CA can cancel each other in the common electrodes of the display apparatus 11 as in the present embodiment, and this prevents the uplink signal US from affecting the operation of the display apparatus 11.

Although the preferred embodiments of the present invention have been described, the present invention is not limited to the embodiments in any sense, and it is obvious that the present invention can be carried out in various manners without departing from the scope of the present invention.

For example, some of the plurality of sensor electrodes 12Y are always selected as the AC signal transmission electrodes, and some other of the plurality of sensor electrodes 12Y are always selected as the cancellation signal transmission electrodes in the first embodiment. However, a first mode of selecting some of the plurality of sensor electrodes 12Y as the AC signal transmission electrodes and selecting some other of the plurality of sensor electrodes 12Y as the cancellation signal transmission electrodes and a second mode of selecting some of the plurality of sensor electrodes 12X as the AC signal transmission electrodes and selecting some other of the plurality of sensor electrodes 12X as the cancellation signal transmission electrodes may be switched every time the uplink signal US is transmitted. This can further reduce the possibility of the stylus 2 failing to receive the uplink signal US.

When, for example, the uplink signal US is to be transmitted to notify the stylus 2 of a new command COM in the state in which the position of the stylus 2 is already determined, transmission of the cancellation signal CA can be omitted. In this case, it is only necessary to transmit the uplink signal US from some of the sensor electrodes 12Y positioned near the position of the stylus 2, and this reduces the possibility of the situation in which the stylus 2 cannot detect the uplink signal US due to the change in the potential of the ground terminal of the stylus 2 caused by the uplink signal US. Therefore, the cancellation signal CA need not be transmitted.

Although the specific example of the apparatus in which the operation is affected by the uplink signal US is the display apparatus 11 in the embodiments, other types of apparatuses, such as a speaker, an NFC communication apparatus, a CMOS camera, and a wireless LAN antenna, may be similarly affected. According to the embodiments, the influence on these devices can also be prevented.

Although the stylus 2 is described as an exemplary device in the embodiments, the present invention can be applied to transmit a signal to any device held by a hand, which includes predetermined electrodes and the detection unit 41 and is configured to receive the uplink signal US on a sensor. The form of the device is not limited to the form of the stylus, and the device may be in a form of an electronic ruler, a computer mouse, a card type, or a virtual reality (VR) controller for moving in three dimensional space, etc.

Although the uplink signal US is an AC signal of a square wave with high or low value (modulated spreading code) in the example described in the embodiments, it is only necessary that the uplink signal US be an AC signal. For example, the uplink signal US may be a sine wave or a square wave and may be modulated or unmodulated.

It is to be noted that the embodiments of the present invention are not limited to the foregoing embodiments, and that various changes can be made without departing from the spirit of the present invention.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A sensor controller connected to a sensor electrode group arranged to form a panel surface, wherein
the sensor controller supplies an uplink signal, to be transmitted from the panel surface to a stylus, to one or more alternating current (AC) signal transmission electrodes that form part of a plurality of sensor electrodes included in the sensor electrode group;
the sensor controller transmits, from one or more cancellation signal transmission electrodes different from the AC signal transmission electrodes, a cancellation signal configured to prevent the uplink signal transmitted from the AC signal transmission electrodes from appearing in a ground terminal of a detection circuit of the stylus;
the sensor controller selects some of the plurality of sensor electrodes as the AC signal transmission electrodes and selects some other of the plurality of sensor electrodes as the cancellation signal transmission electrodes; and
the sensor controller shifts the selected AC signal transmission electrodes in the sensor electrode group, changes at least some of the one or more sensor electrodes selected as the AC signal transmission electrodes, and changes at least some of the one or more sensor electrodes selected as the cancellation signal transmission electrodes.

2. The sensor controller according to claim 1, wherein the cancellation signal is to generate a potential difference between an input end and the ground terminal of the detection circuit of the stylus.

3. The sensor controller according to claim 2, wherein the cancellation signal is a reverse phase signal of the uplink signal.

4. The sensor controller according to claim 2, wherein the cancellation signal is a fixed predetermined potential signal to generate a potential difference between the input end and the ground terminal of the detection circuit of the stylus.

5. The sensor controller according to claim 1, wherein the sensor electrodes include a plurality of rectangular conductors two-dimensionally arranged to allow detection of two-dimensional coordinates of the stylus.

6. The sensor controller according to the claim 5, wherein the sensor electrode group is a self-capacitance type electrode group.

7. The sensor controller according the claim 5, wherein the selected AC signal transmission electrodes form one sensor electrode unit, which is used to transmit the uplink signal.

8. The sensor controller according to claim 7, wherein the uplink signal is transmitted to a location of the stylus and the cancellation signal is transmitted to a location of a palm of a user holding the stylus.

9. A sensor controller connected to a sensor electrode group arranged to form a panel surface, wherein
the sensor electrode group includes a plurality of rectangular conductors two-dimensionally arranged to allow detection of two-dimensional coordinates of a stylus;
the sensor controller supplies an uplink signal, to be transmitted from the panel surface to the stylus, to one or more alternating current (AC) signal transmission electrodes that form part of a plurality of sensor electrodes included in the sensor electrode group;
the sensor controller selects some of the plurality of rectangular conductors as the AC signal transmission electrodes;
the sensor controller shifts the selected AC signal transmission electrodes in the sensor electrode group and changes at least some of the one or more rectangular conductors selected as the AC signal transmission electrodes; and the sensor controller transmits, from one or more cancellation signal transmission electrodes different from the AC signal transmission electrodes, a cancellation signal configured to prevent the uplink signal transmitted from the AC signal transmission electrodes from appearing in a ground terminal of a detection circuit of the stylus.

10. The sensor controller according to the claim 9, wherein the sensor electrode group is a self-capacitance type electrode group.

11. The sensor controller according to claim 9, wherein the uplink signal is transmitted from the rectangular conductors adjacent to a location of the stylus.

12. The sensor controller according to claim 11, wherein the cancellation signal is transmitted from the rectangular conductors adjacent to a palm of a user holding the stylus.

13. The sensor controller according to claim 9, wherein the cancellation signal is to generate a potential difference between an input end and the ground terminal of the detection circuit of the stylus.

14. The sensor controller according to claim 13, wherein the cancellation signal is a reverse phase signal of the uplink signal.

15. The sensor controller according to claim 13, wherein the cancellation signal is a fixed predetermined potential signal to generate a potential difference between the input end and the ground terminal of the detection circuit of the stylus.

16. A method of controlling signal transmission from a sensor controller to a stylus, wherein the sensor controller is connected to a sensor electrode group arranged to form a panel surface, the method comprising:
supplying an uplink signal, to be transmitted from the panel surface to the stylus, to alternating current (AC) signal transmission electrodes that form a part of sensor electrodes included in the sensor electrode group,
transmitting, from cancellation signal transmission electrodes that form another part of the sensor electrodes included in the sensor electrode group and are different from the AC signal transmission electrodes, a cancellation signal configured to prevent the uplink signal transmitted from the AC signal transmission electrodes from appearing in a ground terminal of a detection circuit of the stylus,
selecting some of the plurality of sensor electrodes as the AC signal transmission electrodes and selecting some other of the plurality of sensor electrodes as the cancellation signal transmission electrodes, and
shifting the selected AC signal transmission electrodes in the sensor electrode group, changing at least some of the one or more sensor electrodes selected as the AC signal transmission electrodes, and changing at least some of the one or more sensor electrodes selected as the cancellation signal transmission electrodes.

17. The method according to claim 16, wherein the cancellation signal is to generate a potential difference between an input end and the ground terminal of the detection circuit of the stylus.

18. The method according to claim 16, wherein the cancellation signal is a reverse phase signal of the uplink signal.

19. The method according to claim 16, wherein the cancellation signal is a fixed predetermined potential signal to generate a potential difference between the input end and the ground terminal of the detection circuit of the stylus.

* * * * *